(12) United States Patent
Harada et al.

(10) Patent No.: US 6,259,426 B1
(45) Date of Patent: Jul. 10, 2001

(54) VIDEO IMAGE DISPLAY APPARATUS AND METHOD

(75) Inventors: Shigeru Harada; Junji Kagita, both of Tokyo; Yoshihito Osawa, Saitama; Kazuhiko Fujihara, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/296,106

(22) Filed: Apr. 21, 1999

(51) Int. Cl.$^7$ ....................................................... G09G 5/00
(52) U.S. Cl. ............................. 345/112; 348/44; 348/46
(58) Field of Search .................................. 345/112, 150, 345/153, 154, 155, 419, 421

(56) References Cited

U.S. PATENT DOCUMENTS

| | | | |
|---|---|---|---|
| 5,737,012 | * 4/1998 | Tabata et al. | 348/53 |
| 5,825,456 | * 10/1998 | Tabata et al. | 351/20 |
| 5,860,912 | * 1/1999 | Chiba | 600/111 |
| 6,175,379 | * 1/2001 | Uomori et al. | 348/47 |
| 6,177,952 | * 1/2001 | Tabata et al. | 348/47 |

* cited by examiner

*Primary Examiner*—Bipin Shalwala
*Assistant Examiner*—Nitin Patel
(74) *Attorney, Agent, or Firm*—Frommer Lawrence & Haug, LLP.; William S. Frommer

(57) ABSTRACT

A stereoscopic feeling can be easily emphasized by properly applying seven items of: a front/rear feeling and depth feeling circuit 14 constructed by a front/rear feeling to shift a position of an image in the horizontal direction on the basis of edge information of a video signal and add to a binocular parallax and a depth feeling to set a center fusion image plane to a position behind a display surface; a glossy feeling and contrast emphasizing circuit 15 for detecting a glossy portion of the video signal and emphasizing a contrast of a single eye and both eyes in the glossy portion; a V aperture control and coring sharpness circuit 16 constructed by a vertical aperture control to raise frequencies of a middle low band or higher at a change point in the vertical direction and a coring sharpness to give a sharpness to only an edge having a large amplitude and high frequency components; and a color emphasizing circuit 17 for emphasizing color contrasts of colors other than a skin color.

9 Claims, 35 Drawing Sheets

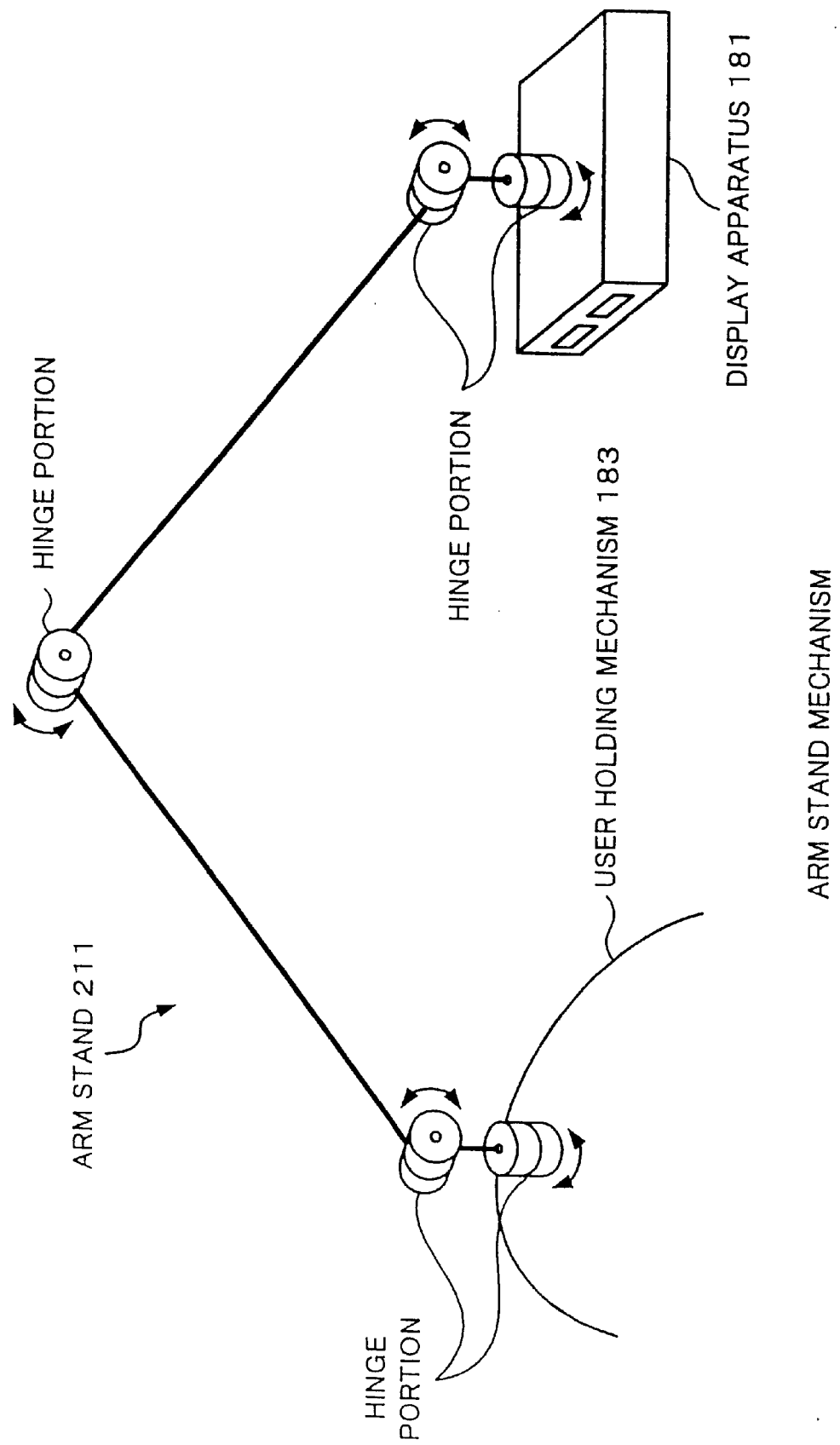

DISPLAY APPARATUS 181

DISPLAY APPARATUS 181

ARM STAND

FIXED METAL FITTING

VIDEO IMAGE DISPLAY APPARATUS AND METHOD

BACKGROUND OF THE INVENTION

1. Field of the Invention

The invention relates to a video display method and a video display apparatus which can emphasize a stereoscopic feeling in a video signal.

2. Description of the Related Art

Among stereoscopic display systems, there is a stereoscopic display system using a right/left parallax information as a system having the highest possibility of realization. According to this system, two cameras are used upon photographing and a signal for the left eye and a signal for the right eye are obtained. Upon reception, the right-eye signal and left-eye signal are reproduced so as to be displayed to each eye.

FIG. 1 shows a principle of the stereoscopic observing operation using the binocular (right/left) parallax. Images obtained by shifting a left-eye video image 3L and a right-eye video image 3R in the horizontal direction are displayed on a display surface 1. Usually, a focal point of both of left and right eyes (2L, 2R) (it is an intersecting point where the right and left sight lines cross and is called a point where vergence is matched) and a focal point of each eye (2L, 2R) (it is a point where an adjustment of the single eye is matched) are the same location. Specifically speaking, a CRT surface in case of a CRT or the like is a location where the vergence and the adjustment are matched. A screen in case of a projector or the like is a location where the vergence and the adjustment are matched.

FIG. 1A shows a case of a cross vergence. In this case, the video image 3R shifted to the left is displayed to the right eye 2R and the video image 3L shifted to the right is displayed to the left eye 2L. At this time, an image is fused in the head as if an object existed at the position where the vergences of the right and left eyes are matched. A virtual image 4A is seen as if it was projected toward this side from the display surface 1. FIG. 1B shows a case of a parallel vergence (non-cross vergence). In this case, the video image 3L shifted to the left is displayed to the left eye 2L and the video image 3R shifted to the right is displayed to the right eye 2R. In the parallel vergence, a virtual image 4B is fused behind the display surface 1.

A process to obtain a stereoscopic feeling by using such a principle of the binocular parallax even in an ordinary 2-dimensional image is an emphasis of a stereoscopic feeling using an effect of a Pulfrich.

The Pulfrich's effect (or Pulfrich's law) is a principle such that "when an object which reciprocates to the right and left in a vertical plane in front of the eyes is observed by the both eyes while a filter (ND filter) to reduce the light is attached to one of the eyes, the object is seen as if it moved while drawing an elliptic locus with a depth in a manner such that the object is located in front of and behind the inside of the vertical plane". For example, as shown in FIG. 2, if a pendulum which reciprocates to the right and left in a plane 6 is seen in a state where an ND filter 5 is attached to the left eye 2L, the pendulum is observed in a manner such that when the pendulum moves from the right to the left, the pendulum passes in front of the plane 6 and, when the pendulum moves from the left to the right, the pendulum passes behind the plane 6 and the locus of the pendulum forms an elliptic orbit 7.

Such a Pulfrich's effect occurs because, when signals from the eyes is transmitted to the cerebrum, a time that is required until the signal is transmitted from the left eye 2L to which the light was weakened to the cerebrum has a time delay as compared with that from the right eye 2R to which the light is not weakened. That is, in the example of FIG. 2, when the pendulum moves from the right to the left and exists at a position of q, the signal from the left eye 2L is delayed, so that the left eye 2L recognizes the pendulum as if it existed at a position of p at this moment. A binocular parallax occurs as mentioned above and the viewer feels as if the pendulum existed at a position of N due to the cross vergence shown in FIG. 1A mentioned above. On the contrary, when the pendulum moves from the left to the right and exists at the position of q, the left eye 2L recognizes the pendulum as if it existed at a position of r. Due to the binocular parallax, the viewer feels as if the pendulum existed at a position of F due to the parallel vergence shown in FIG. 1B.

As mentioned above, there is the method using the Pulfrich's effect as a method of emphasizing the stereoscopic feeling of an ordinary 2-dimensional video image.

The Pulfrich's effect, however, has drawbacks such that only a moving object can be stereoscopically seen and the stereoscopic feeling is influenced by a moving speed and a moving direction, namely, a depth feeling changes depending on the moving speed and there is a problem such that the front side and the rear side are unconditionally determined by the moving direction.

That is, there is a problem such that the Pulfrich's effect does not function for a still image although a stereoscopic feeling (depth feeling) of only an object which moves in a specific direction is merely enhanced.

OBJECTS AND SUMMARY OF THE INVENTION

It is, therefore, an object of the invention to provide a video display method and a video display apparatus in a stereoscopic display system using a binocular (right/left) parallax effect, in which a stereoscopic feeling (front/rear feeling) can be emphasized in an ordinary 2-dimensional video signal besides a 3-dimensional video signal.

According to the invention disclosed in claim 1, there is provided a video display apparatus for receiving a video signal and displaying a video image by a display apparatus, comprising: front/rear feeling emphasizing means for moving a position of an image in a horizontal scanning line in the horizontal direction in accordance with an amplitude level and a frequency level of a change in video signal by using edge information or focusing information of the video signal and adding a binocular parallax (right/left eye non-corresponding area); depth feeling emphasizing means for setting a center fusion image plane to a position behind a display surface by a parallel vergence; glossy feeling emphasizing means for detecting a glossy portion of the image and emphasizing a contrast of one eye and/or both eyes in the glossy portion; coring sharpness means for giving a sharpness to only an edge having a large amplitude and a high frequency component; vertical aperture control means for raising frequency characteristics of a middle low band or higher at a change point in the vertical direction of the image; and color emphasizing means for detecting a skin color as a memory color and emphasizing a color contrast of colors other than the skin color, wherein a stereoscopic feeling is emphasized by using two or more of the above means.

According to the invention disclosed in claim 9, there is provided a video display method of receiving a video signal and displaying a video image by a display apparatus, comprising: a front/rear feeling emphasizing step of moving a position of an image in a horizontal scanning line in the horizontal direction in accordance with an amplitude level and a frequency level of a change in video signal by using edge information or focusing information of the video signal and adding a binocular parallax (right/left eye non-corresponding area); a depth feeling emphasizing step of setting a center fusion image plane to a position behind a display surface by a parallel vergence; a glossy feeling emphasizing step of detecting a glossy portion of the image and emphasizing a contrast of one eye and/or both eyes in the glossy portion; a coring sharpness step of giving a sharpness to only an edge having a large amplitude and a high frequency component; a vertical aperture control step of raising frequency characteristics of a middle low band or higher at a change point in the vertical direction of the image; and a color emphasizing step of detecting a skin color as a memory color and emphasizing a color contrast of colors other than the skin color, wherein a stereoscopic feeling is emphasized by using two or more of the above steps.

According to the invention, the stereoscopic factors of seven items of a front/rear feeling, a depth feeling, a glossy feeling, a contrast emphasis, a vertical aperture control (hereinafter, abbreviated to a V aperture control), a coring sharpness, and a color emphasis are applied, even in case of an ordinary 2-dimensional video signal, various factors effectively function, so that a video expression of an enhanced stereoscopic feeling can be realized. In a video image photographed by an ordinary camera, the front/rear feeling or coring sharpness effectively functions to the stereoscopic observation by applying a binocular parallax (right/left eye non-corresponding area) to a boundary of the image or emphasizing a sharpness thereof. Although a video image like a scenery picture is pan-focused, since there is perspective, the parallel vergence effectively functions. In a video image of fruit or a fresh video image, the color emphasis and the improvement of the glossy feeling and contrast effectively function for improvement of the contrast and glossy feeling of an object image. In case of a computer graphics (hereinafter, abbreviated to a CG) video image, the color emphasis and the V aperture control effectively emphasize a shade of the CG and emphasize its stereoscopic feeling. As mentioned above, those effects can be caused without being influenced by a still/moving state.

The above and other objects and features of the present invention will become apparent from the following detailed description and the appended claims with reference to the accompanying drawings.

BRIEF DESCRIPTION OF THE DRAWINGS

FIG. 36 is a diagram showing the fifth example of a display apparatus to which the invention is applied.

DETAILED DESCRIPTION OF THE PREFERRED EMBODIMENTS

Figure 3:
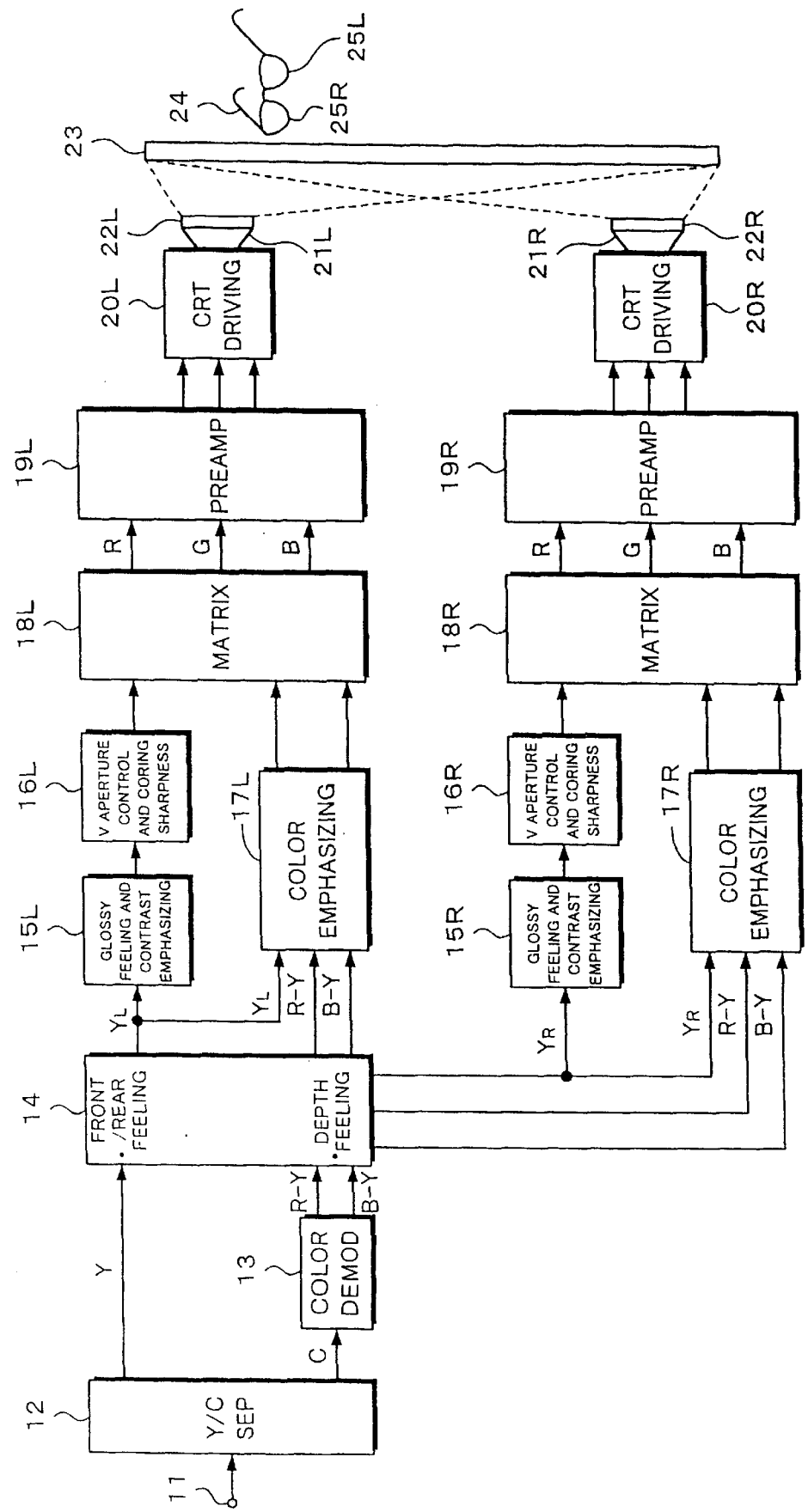
FIG. 3 is a block diagram of the first embodiment of the invention.

Embodiments of the invention will now be described hereinbelow with reference to the drawings. FIG. 3 shows the first embodiment of the invention. FIG. 3 shows an example in the case where factors to emphasize a stereoscopic feeling corresponding to seven items of a front/rear feeling, a depth feeling, a glossy feeling, a contrast emphasis, a V aperture control, a coring sharpness, and a color emphasis are applied to a projection type display using two projectors for displaying right and left video images, respectively.

In FIG. 3, a 2-dimensional video signal (composite color video signal) is supplied to an input terminal 11. For example, a television broadcasting signal received by an antenna and a tuner is an example of the 2-dimensional video signal. As other means, the 2-dimensional video signal can be also received from an analog satellite broadcasting, a digital broadcasting, or a video signal reproducing apparatus using a medium such as a disc or tape.

The input color video signal is supplied to a Y/C separating circuit 12, by which a luminance signal Y and a chrominance signal (carrier chrominance signal) C are separated. The chrominance signal C is supplied to a color demodulating circuit 13 and is color demodulated. Two color difference signals (R−Y and B−Y) are generated from the color demodulating circuit 13. The luminance signal Y and color difference signals R−Y and B−Y are supplied to a front/rear feeling and depth feeling circuit 14. The luminance signal Y to which a front/rear feeling process and a depth feeling process as will be explained hereinlater were performed in the front/rear feeling and depth feeling circuit 14 is supplied as a luminance signal $Y_L$ to a glossy feeling and contrast emphasizing circuit 15L and a color emphasizing circuit 17L of a video signal path for the left eye. The signal to which a glossy feeling process and a contrast emphasis as will be explained hereinlater were performed in the glossy feeling and contrast emphasizing circuit 15L is supplied to a V aperture control and coring sharpness circuit 16L.

The luminance signal $Y_L$ supplied to the V aperture control and coring sharpness circuit 16L is subjected to a V aperture control to raise frequency characteristics of a middle low band or higher at a change point in the vertical direction of an image as will be explained hereinlater and a coring sharpness to give a sharpness to only an edge having a large amplitude and a high frequency component and the resultant signal is supplied to a matrix circuit 18L. The color difference signals R−Y and B−Y from the front/rear feeling and depth feeling circuit 14 are supplied to the color emphasizing circuit 17L of the video signal path for the left eye. In the color emphasizing circuit 17L, a color emphasis to emphasize a color contrast of the colors other than the skin color as will be explained hereinlater, is performed to the color difference signals R−Y and B−Y as will be explained hereinlater. The color emphasized color difference signals R−Y and B−Y are supplied to the matrix circuit 18L. In a manner similar to the video signal path for the left eye, a glossy feeling and contrast emphasizing circuit 15R, a V aperture control and coring sharpness circuit 16R, and a color emphasizing circuit 17R are also provided on a video signal path for the right eye.

In the disclosure of the specification, reference characters L and R are used to show a correspondence relation between the video image of the left eye and the video image of the right eye. For simplicity of explanation, a construction for audio signal processes is omitted here.

Three primary color signals R, G, and B are formed by matrix circuits 18L and 18R. The three primary color signals R, G, and B formed by matrix circuit 18L are supplied to a CRT driving circuit 20L via a preamplifier 19L. The three primary color signals R, G, and B formed by matrix circuit 18R are supplied to a CRT driving circuit 20R via a preamplifier 19R.

CRTs 21L and 21R for projection are driven by the CRT driving circuits 20L and 20R, respectively. Two projectors are constructed by the CRT driving circuits and CRTs. As projectors, three CRTs which are driven by the primary color signals can be used or liquid crystal displays can be also used in place of the CRTs. A projector with any of a reflection type and a transmission type can be used.

The video image for the left eye and the video image for the right eye which were generated by the projector are overlappingly displayed at the same position on a screen 23. At this time, the video images are overlapped so as not to shift the positions of the video images. It is assumed that the video image for the left eye that is projected by the CRT 21L is an image passed through a horizontal polarizing filter 22L. On the other hand, it is assumed that the video image for the right eye that is projected by the CRT 21R is an image passed through a vertical polarizing filter 22R.

By using glasses 24 having a horizontal polarizing filter 25L on the left eye and having a vertical polarizing filter 25R on the right eye, a video image displayed on the screen 23 by the CRTs 21L and 21R can be separately seen. Filters of different polarizing directions, for example, dextrorotatory and levorotatory polarizing filters can be also used without limiting to the horizontal and vertical polarizing filters.

Figure 1A:
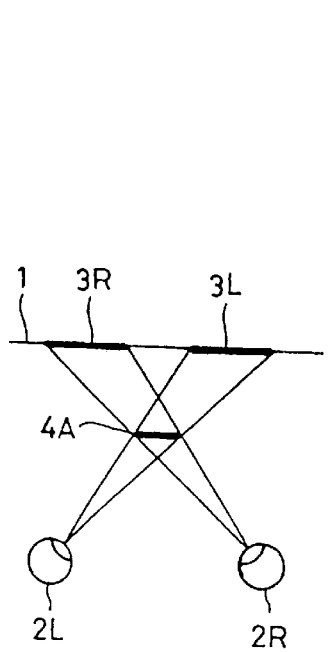
FIGS. 1A and 1B are schematic diagrams for explaining a method of emphasizing a stereoscopic feeling by parallax information.
Figure 1B:
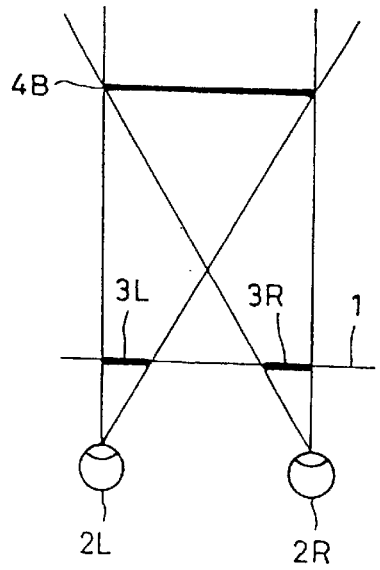
Figure 2:
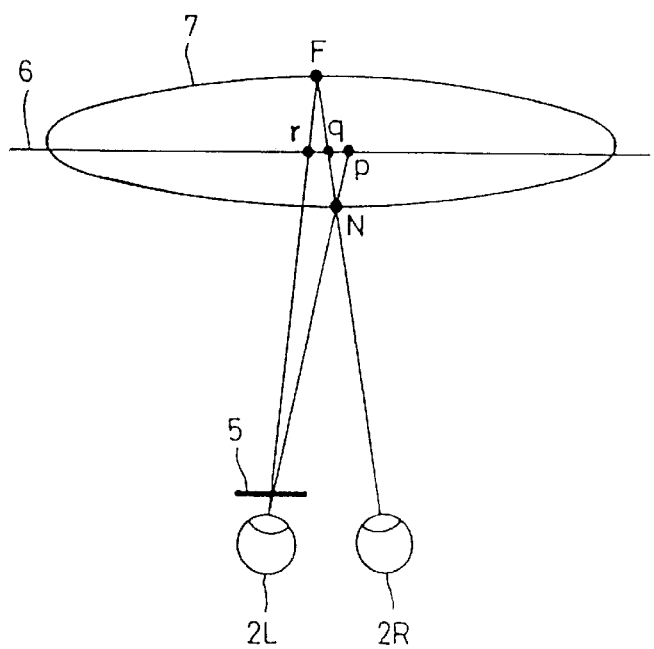
FIG. 2 is a schematic diagram for explaining a Pulfrich's law as an example of a method of emphasizing the stereoscopic feeling by the parallax information.

In the first embodiment, the luminance signal Y and two color difference signals R−Y and B−Y which were Y/C separated and chroma-decoded are inputted to the block of the front/rear feeling and parallel vergence shown in the front/rear feeling and depth feeling circuit 14. In this block, the signal for the right eye is delayed by a time that is longer than the signal for the left eye by a predetermined value. Thus, the right-eye signal is shifted to the right on the display surface from the left-eye signal. A parallel vergence such that the video image is fused on the rear side than the display surface because of the principle of the binocular parallax shown in FIG. 1 is realized.

Figure 4:
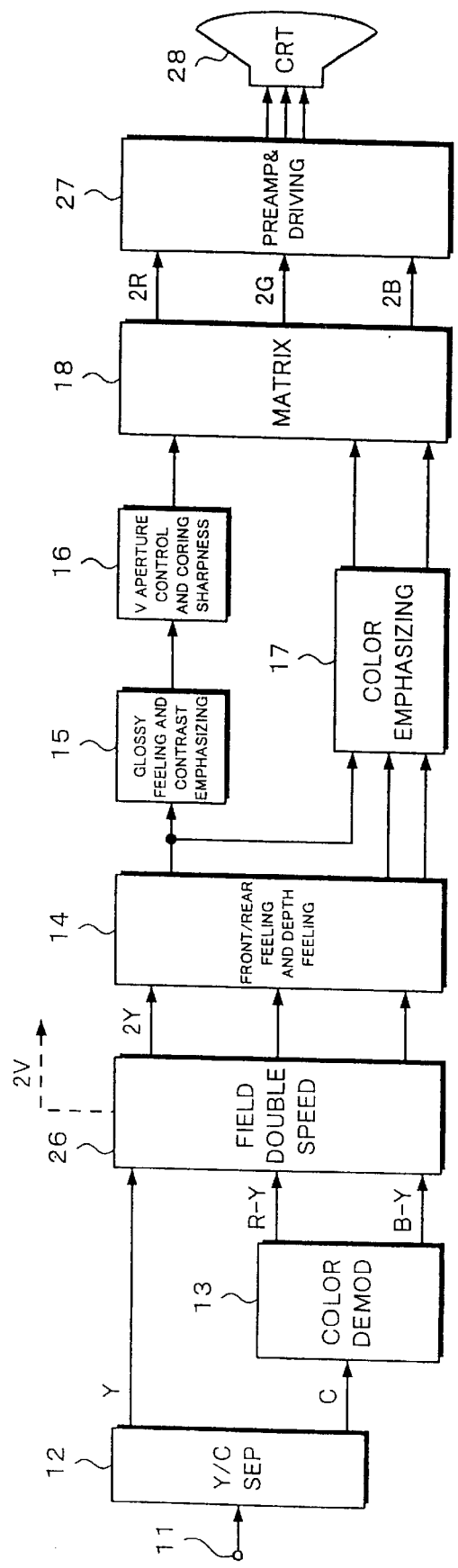
FIG. 4 is a block diagram of the second embodiment of the invention.

The second embodiment when a field double speed CRT is used is shown in FIG. 4. A 2-dimensional video signal (composite color video signal) is supplied to the input terminal 11. The input color video signal is supplied to the Y/C separating circuit 12, by which the luminance signal Y and the chrominance signal (carrier chrominance signal) C are separated. The chrominance signal C is supplied to the color demodulating circuit 13 and is color demodulated. Two color difference signals (R−Y and B−Y) are generated from the color demodulating circuit 13. The luminance signal Y and color difference signals R−Y and B−Y are supplied to a field double speed circuit 26.

In the field double speed circuit 26, a luminance signal 2Y, color difference signals 2(R−Y) and 2(B−Y), and a pulse signal 2V of the field double speed are generated as will be explained hereinlater.

The luminance signal 2Y and color difference signals 2(R−Y) and 2(B−Y) are supplied to the front/rear feeling and depth feeling circuit 14. The luminance signal 2Y to which a front/rear feeling process and a depth feeling process were performed in the front/rear feeling and depth feeling circuit 14 is supplied as a luminance signal 2Y to a glossy feeling and contrast emphasizing circuit 15. The signal to which a glossy feeling process and a contrast emphasis were performed in the glossy feeling and contrast emphasizing circuit 15 is supplied to a V aperture control and coring sharpness circuit 16.

The luminance signal 2Y supplied to the V aperture control and coring sharpness circuit 16 is subjected to a V aperture control and a coring sharpness as will be explained hereinlater and the resultant signal is supplied to a matrix circuit 18. The color difference signals 2(R−Y) and 2(B−Y) from the front/rear feeling and depth feeling circuit 14 are supplied to a color emphasizing circuit 17. In the color emphasizing circuit 17, a color emphasis is performed to the color difference signals 2(R−Y) and 2(B−Y). The color emphasized color difference signals 2(R−Y) and 2(B−Y) are supplied to the matrix circuit 18. Three primary color signals 2R, 2G, and 2B are formed by the matrix circuit 18. The three primary color signals 2R, 2G, and 2B are supplied to a preamplifier and driving circuit 27. In the preamplifier and driving circuit 27, a predetermined process, for example, a gamma (γ) correction is performed. A CRT 28 is driven by the circuit 27 and a video image is displayed on the CRT 28.

The front/rear feeling and depth feeling circuit 14 and glossy feeling and contrast emphasizing circuit 15 shown in FIG. 4 change a drive by the fields corresponding to the pulse signal 2V which is formed by the field double speed circuit 26, namely, corresponding to the right and left eyes after the double speed process.

Although the above first embodiment relates to an example of a time base modulation using two projectors, the second embodiment relates to an example using a field double speed CRT. In this case, the first field obtained by performing the double speed process to the field is set to the video signal for the left eye and the second field obtained by performing the double speed process to the field is set to the video signal for the right eye. The second embodiment differs from the embodiment using the two projectors with respect to a point that it is sufficient to use one system as a delay line to be time base modulated because the left-eye signal and the right-eye signal are separately processed every double speed field. However, since the polarity to be modulated needs to be changed for the left eye and the right eye, it is necessary to reverse the polarity of the high frequency component to modulate the time base every double speed field. In the case where the video signal of the left eye is set to a predetermined delay time and a delay time of only the video signal of the right eye is changed, it is sufficient to time base modulate only the field of the right eye. On the contrary, it is also possible to set the delay time of the right eye to a predetermined time and to time base modulate only the field of the left eye.

Figure 5:
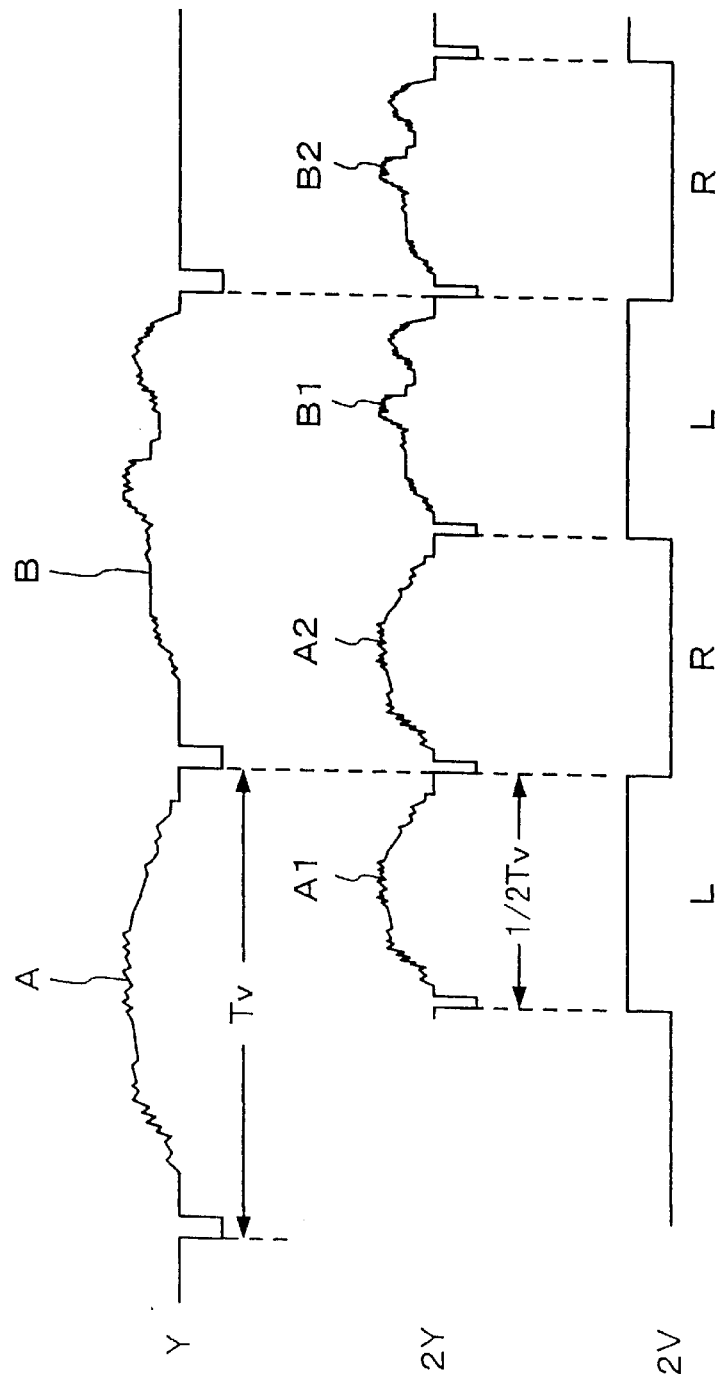
FIGS. 5A to 5C are schematic diagrams for explaining the realization of a field double speed which is applied to the invention.

Processes by the field double speed circuit 26 will now be described with reference to FIG. 5. In FIG. 5, a construction for the color difference signals is omitted for simplicity of explanation. When the input luminance signal Y (FIG. 5A) of a field period Tv (1/60 second in the NTSC system; 1/50 second in the CCIR system) is supplied, an output luminance signal (FIG. 5B) of a field period of ½·Tv is formed. That is, a pair of fields A1 and A2 of a double field frequency are formed from a field A of the input luminance signal. A pair of fields B1 and B2 of a double field frequency are formed from a field B of the input luminance signal. Fig. 5C shows the pulse signal 2V whose level is inverted every double speed field. Such a double speed process can be realized by a method of converting the video signal to the digital signal and time base compressing the signal by a digital memory.

The first field (A1, B1, . . . ) in which the pulse signal 2V synchronized with the double speed field is at the high level is used as a video signal for the left eye and the second field (A2, B2, . . . ) in which the pulse signal 2V is at the low level is used as a video signal for the right eye. The field double speed luminance signal 2Y and pulse signal 2V are generated from the field double speed circuit 26.

The luminance signal 2Y and color difference signals after completion of the processes from the field double speed circuit 26 are supplied to the matrix circuit 18. The three primary color signals 2R, 2G, and 2B of the field double speed are formed by the matrix circuit 18. The three primary color signals are supplied to the CRT 28 via the preamplifier and driving circuit 27. The CRT 28 can display a color video signal of the field double speed. That is, a vertical scanning frequency and a horizontal scanning frequency of the CRT 28 are set to be twice as high as the frequencies in case of displaying a video signal of a speed which is not a double speed.

A video image which is displayed by the CRT 28 is an image which was stereoscopically emphasized by the front/rear feeling and depth feeling circuit 14, glossy feeling and contrast emphasizing circuit 15, V aperture control and coring sharpness circuit 16, and color emphasizing circuit 17. Therefore, even if the viewer observes the video image without wearing the glasses, a stereoscopic feeling is caused. Further, by wearing the glasses with the shutters to the right and left eyes and observing the image, the stereoscopic feeling is also emphasized. As shutters attached to the glasses, shutters which can be electrically turned on and off, for example, liquid crystal shutters can be used. The shutters are controlled so as to perform the ON/OFF operations by a pulse signal synchronized with the pulse signal 2V from the field double speed circuit 26. For example, the pulse signal 2V is received from the receiver side by an infrared transmission, the left shutter is turned on and the right shutter is turned off for a period of time during which the pulse signal 2V is at the high level, and the ON/OFF states are reversed for a period of time during which the pulse signal 2V is at the low level. Thus, the video image for the left eye and the video image for the right eye which are displayed by the CRT 28 can be seen to the left and right eyes. When the right and left video images are separately seen, in addition to the stereoscopic feeling, the glossy feeling can be emphasized.

Figure 6:
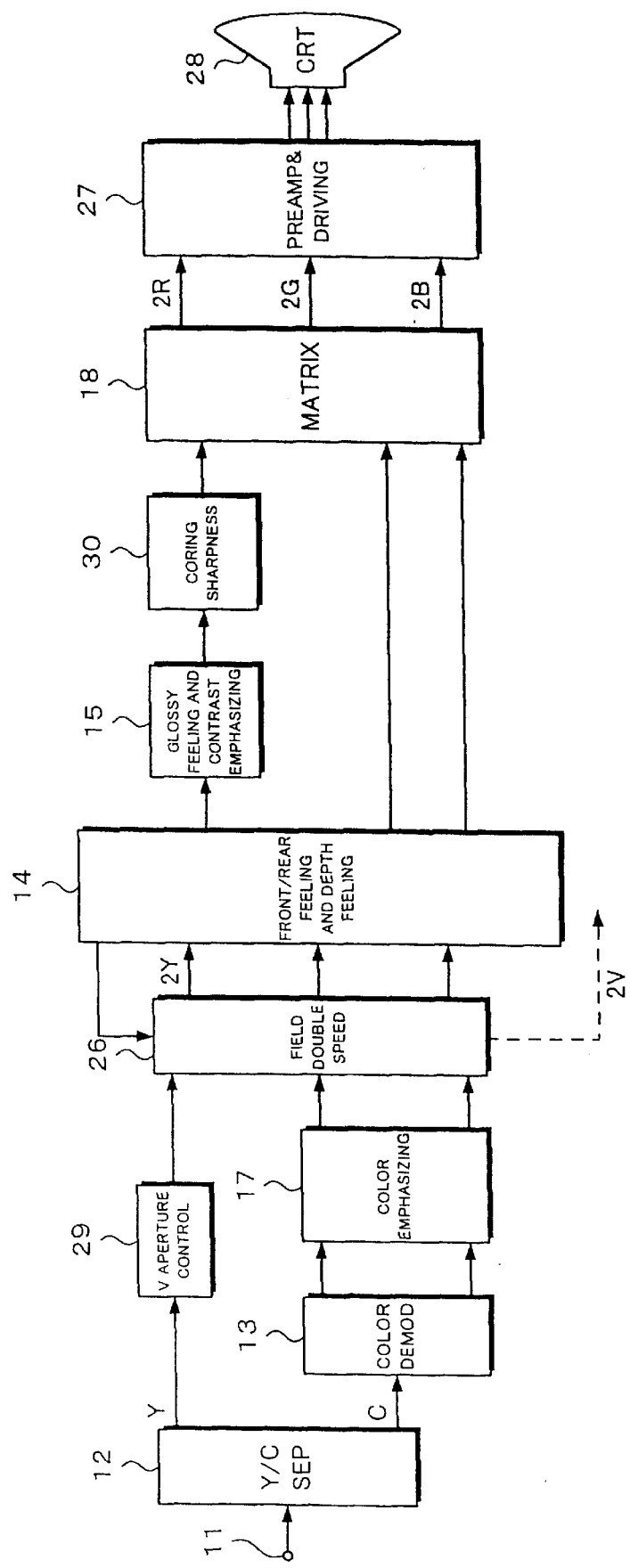
FIG. 6 is a block diagram of the third embodiment of the invention.

FIG. 6 shows a construction of the third embodiment. The luminance signal Y and chrominance signal C corresponding to the composite color video signal from the input terminal 11 are derived by the Y/C separating circuit 12. The luminance signal Y is supplied to a V aperture control circuit 29 and the chrominance signal C is supplied to the color demodulating circuit 13. The V aperture control circuit 29 performs a V aperture control process to the supplied luminance signal Y. The two color difference signals (R−Y and B−Y) from the color demodulating circuit 13 are supplied to the color emphasizing circuit 17. The color emphasizing circuit 17 performs a color emphasis to the supplied two color difference signals.

The field double speed circuit 26 to which the luminance signal Y from the V aperture control circuit 29 and the color difference signals R−Y and B−Y from the color emphasizing circuit 17 are supplied forms a video signal of the double field frequency from the input video signal as shown in FIG. 5 mentioned above. The field double speed luminance signal 2Y and field double speed color difference signals 2(R−Y) and 2(B−Y) are generated from the field double speed circuit 26. The generated field double speed luminance signal 2Y and field double speed color difference signals 2(R−Y) and 2(B−Y) are supplied to the front/rear feeling and depth feeling circuit 14.

In this instance, the front/rear feeling and depth feeling circuit 14 realizes a depth feeling (parallel vergence) by changing the reading timing of the signal recorded in a field memory every double speed field (every right and left eyes). In case of the stereoscopic display method using the depth information, in accordance with a change in luminance level of the video signal or changes in levels of R, G, and B, by modulating the depth information by using their differentiated components, the front/rear feeling (stereoscopic feeling) is also emphasized even in a 2-dimentional video signal.

As mentioned above, in the front/rear feeling and depth feeling circuit 14, the front/rear feeling process and the depth feeling process are performed to the supplied field double speed luminance signal 2Y and field double speed color difference signals 2(R−Y) and 2(B−Y). The processed luminance signal is transmitted to the glossy feeling and contrast emphasizing circuit 15 and the color difference signals are supplied to the matrix circuit 18. In the glossy feeling and contrast emphasizing circuit 15, the glossy feeling process and contrast emphasis are performed to the supplied luminance signal. In a coring sharpness circuit 30, a sharpness according to an amplitude of an edge component is added.

The luminance signal Y from the coring sharpness circuit 30 and the two color difference signals (R−Y and B−Y) from the front/rear feeling and depth feeling circuit 14 are supplied to the matrix circuit 18. The three primary color signals 2R, 2G, and 2B of the field double speed are formed by the matrix circuit 18. The three primary color signals are supplied to the CRT 28 via the preamplifier and driving circuit 27. The CRT 28 can display a color video signal of the field double speed.

In FIG. 6, there is no problem even if the circuits for the V aperture control, coring sharpness, and color emphasis are positioned before the front/rear feeling and the depth feeling circuit. In this case, in the stereoscopic display system of two systems such as a double projector type, if the above arrangement is used, it is sufficient to use one system of the circuits for the V aperture control, coring sharpness, color emphasis, and the like. Further, by arranging them as mentioned above, the color emphasizing circuit and the V aperture control circuit can execute processes at an ordinary speed. Although it is desired to arrange the glossy feeling and contrast emphasizing circuit after the front/rear feeling and depth feeling circuit, the processing order of the other circuits is not particularly limited. They can be arranged in accordance with a desired processing order adapted to each system.

Even in the third embodiment of the invention shown in FIG. 6, it is also possible to control so as to set a delay amount of only one of the left-eye video signal and the right-eye video signal to be variable and to fix the other delay amount.

Figure 7:
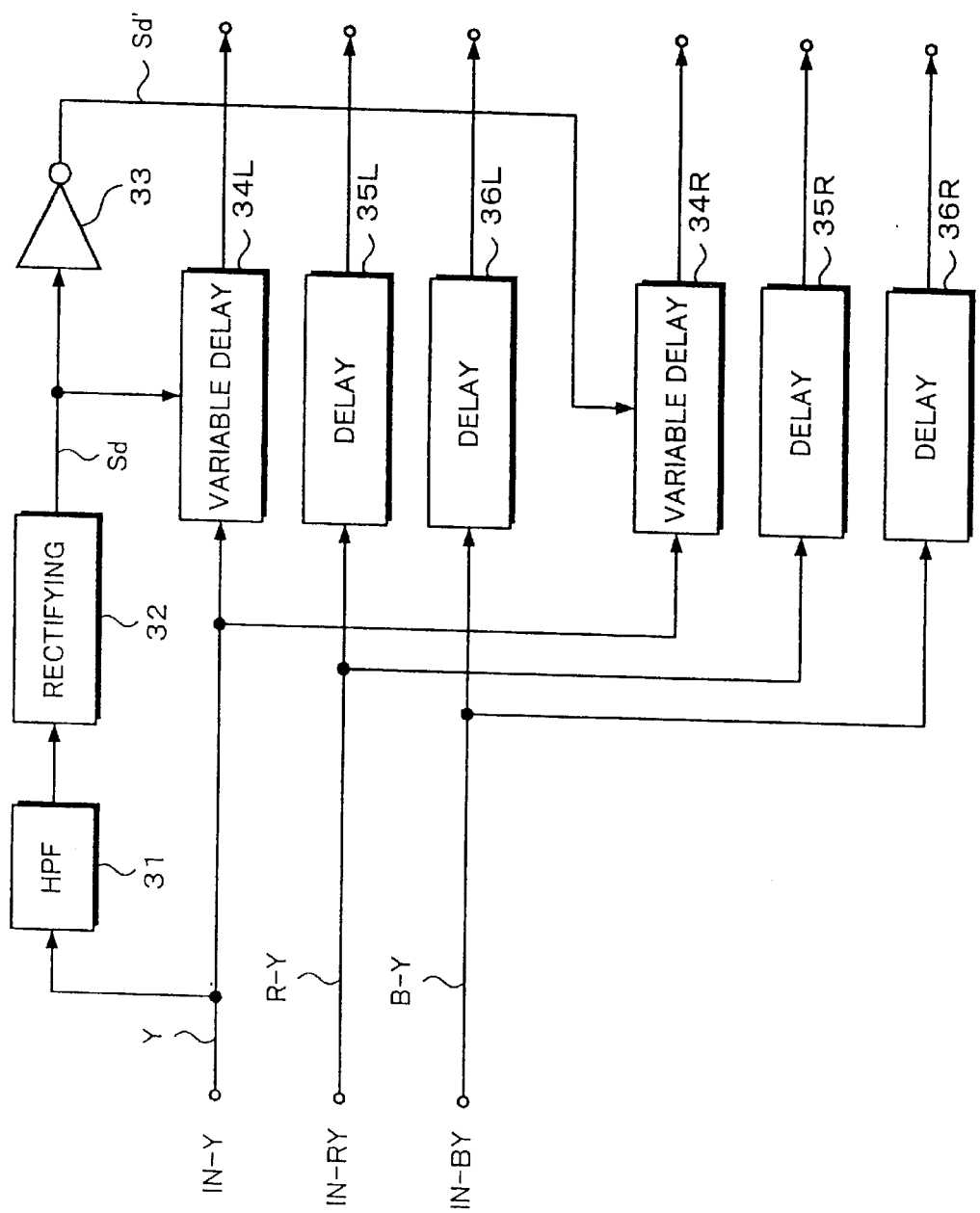
FIG. 7 is a block diagram showing the first example of a construction to detect a front/rear feeling which is applied to the invention.

Each component element in the foregoing first, second, and third embodiments will now be described. First, FIG. 7 shows the first example of a more detailed construction of the front/rear feeling and depth feeling circuit 14 to add a binocular parallax by using the front/rear feeling. The luminance signal Y which is supplied from an input terminal IN-Y is sent to a variable delay circuit 34L of the video signal path for the left eye. A delay amount of the variable delay circuit 34L is varied by a detection signal Sd. The color difference signal R−Y which is supplied from an input terminal IN-RY is transmitted to a fixed delay circuit 35L of the video signal path for the left eye. The color difference signal B−Y which is supplied from an input terminal IN-BY is transmitted to a fixed delay circuit 36L of the video signal path for the left eye. The luminance signal Y and color difference signals R−Y and B−Y which were delayed by the variable delay circuit 34L and delay circuits 35L and 36L are outputted from output terminals, respectively.

In a manner similar to the video signal path for the left eye, a variable delay circuit 34R and fixed delay circuits 35R and 36R are provided on the video signal path for the right eye. A delay amount of the variable delay circuit 34R is varied by a detection signal Sd'.

In this example, the variable delay circuits 34L and 34R control so as to shift the horizontal positions of the left and right video images in the opposite directions in accordance with the edge information in the input video signal, thereby forming right and left video images having the parallax information (right/left eye non-corresponding area). At the same time, in case of an object having much edge information, it is determined to be a foreground and an image fusion is performed in front of the display surface by the parallax information. On the other hand, in case of an object having little edge information, it is determined to be a background and an image fusion is performed behind the display surface by the parallax information. An amount of edge information is detected on the basis of the luminance signal Y from the Y/C separating circuit 12. That is, by transmitting the luminance signal Y through a high pass filter 31 and a rectifying circuit 32, the detection signal Sd is formed.

The high pass filter 31 detects high frequency components in the luminance signal. The high frequency components (differentiated components) includes a pulse of a positive polarity and a pulse of a negative polarity. The rectifying circuit 32 rectifies an output signal of the high pass filter 31 and generates the detection signal Sd having one of the positive and negative polarities. As a construction to detect an amount of edge information, a construction other than the high pass filter 31 and rectifying circuit 32 can be used. For example, it is also possible construct such that an edge portion is extracted by a digital signal process, a magnitude of an inclination of the edge and an amplitude of the edge are detected, and the detection signal Sd according to an amount of edge portion is generated. In place of the high pass filter 31, a filter having a function which can cut out DC components, namely, a function which can detect an edge (change) of an image can be used, or there is no need to use a high pass filter that is accurate in an analogwise manner so long as a logic circuit can be constructed.

The variable delay circuit 34L has a delay amount of (D−α+Δx) and the variable delay circuit 34R has a delay amount of (D+α−Δx). ±α denote fixed delay amounts to set the center fusion image plane to a position behind the display surface. The center fusion image plane is a surface on which a video image that is determined to be the most behind position is displayed. For example, (0≦Δx≦α). When α=Δx, the delay amounts of the variable delay circuits 34L and 34R are set to D. This value corresponds to the case of an image that is determined to be the most foreground position. In this case, the video image is displayed on the display surface. Actually, since the phase of the signal cannot be advanced, the delay time is controlled by using the fixed delay amount D as a center. A delay amount of each of the delay circuits 35L, 35R, 36L, and 36R is fixed to D.

The detection signal Sd is supplied to the variable delay circuit 34L as a signal to control the delay amount Δx of the variable delay circuit 34L and is also supplied to an inverter 33. The detection signal Sd' inverted by the inverter 33 is supplied to the variable delay circuit 34R as a signal to control the delay amount Δx of the variable delay circuit 34R. In the variable delay circuits 34L and 34R, the change amount Δx is varied by the supplied detection signal Sd and Sd'. The inverter 33 is not limited to the construction in which the polarity is inverted but can also have a construction such that a complementary output is generated. In the complementary construction, when the level of the detection signal Sd is set to (0≦Sd≦1), a signal having a level of (1−Sd) is generated as a level of the detection signal Sd'. By supplying the detection signals Sd and Sd' to the variable delay circuits 34L and 34R, the luminance signals in the left and right video images are modulated in the opposite directions (namely, ±Δx) on the time base. That is, the positions in the horizontal direction of the left and right video images are controlled so as to be shifted in the opposite directions by the detection signals Sd and Sd'. Further, the control due to the detection signals Sd and Sd' adapted to reflect the amount of edge information allows the object image having the edge to be fused to one of the position in front of the display surface and the position behind it.

Figure 8:
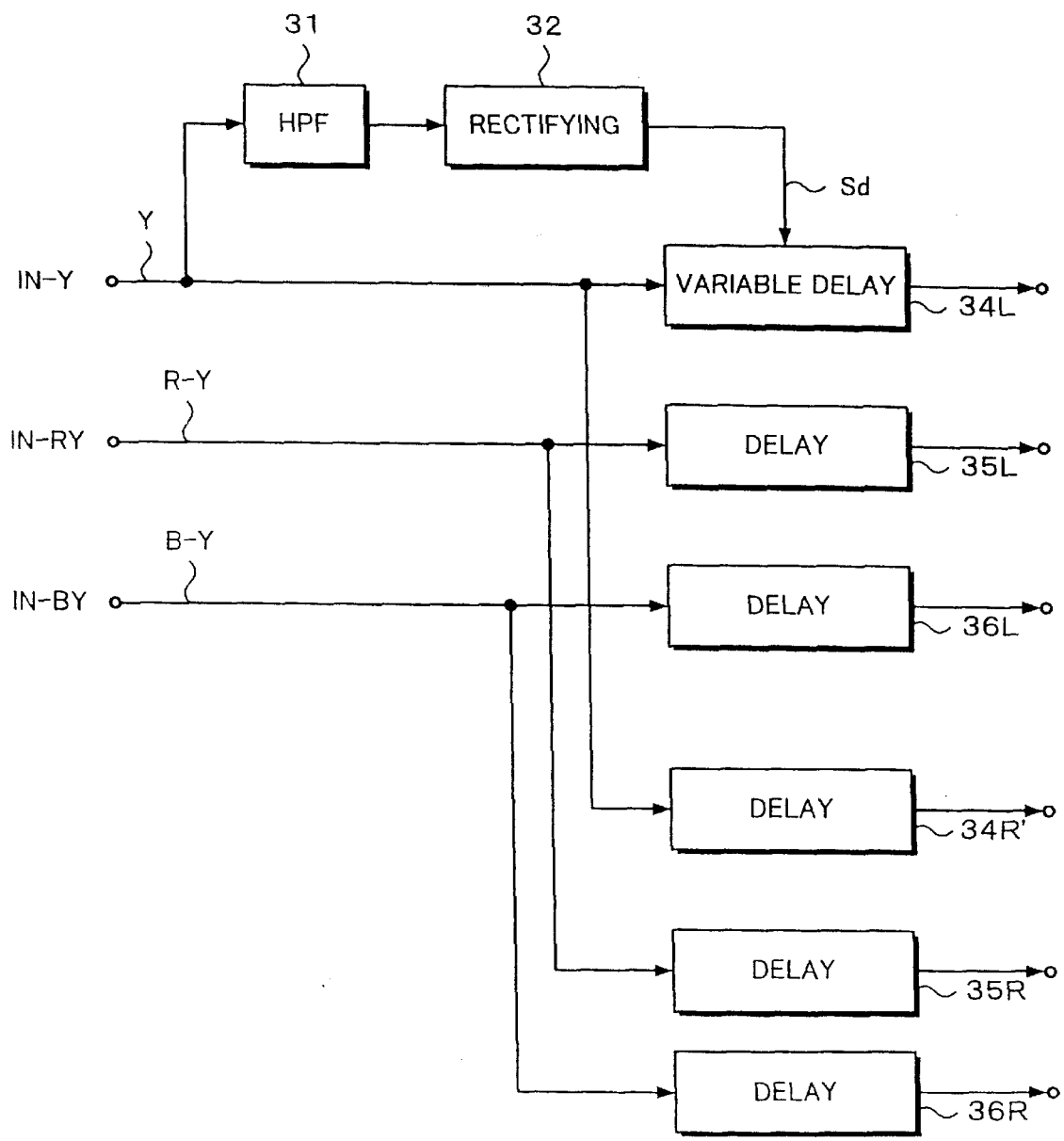
FIG. 8 is a block diagram showing the second example of a construction to detect a front/rear feeling which is applied to the invention.

FIG. 8 shows the second example of a more detailed construction of the front/rear feeling and depth feeling circuit 14 to add the binocular parallax by using the front/rear feeling. FIG. 8 differs from the construction of FIG. 7 with respect to a point that a fixed delay circuit 34R' is used in place of the variable delay circuit 34R. According to the construction of FIG. 7, a control is made so as to delay the left-eye video signal and the right-eye video signal in the opposite directions. In the construction of FIG. 8, however, only one left-eye video signal is controlled and a fixed delay is given to the right-eye video signal. Since the control in one direction is performed, although a delay amount is reduced to the half of that in the control of both directions, it is sufficient to use one variable delay circuit.

In FIG. 8, the delay amount is controlled by giving the fixed delay (D+α) to the right-eye video signal and giving the change amount Δx to the delay amount (D−α) of the left-eye video signal. However, it will be obviously understood that a similar construction and effect will be derived even if the delay amount is controlled by giving the fixed delay to the left-eye video signal and giving the change amount Δx to the right-eye video signal.

Although the control of the time base (position in the horizontal direction) is performed to only the luminance signal, the two color difference signals can be also controlled in a manner similar to the luminance signal. Generally, with respect to the color difference signals, since the resolution is hard to be perceived as compared with the luminance signal, an effect to enhance the stereoscopic feeling (front/rear feeling) is caused even by the control of only the luminance signal.

Figure 9:
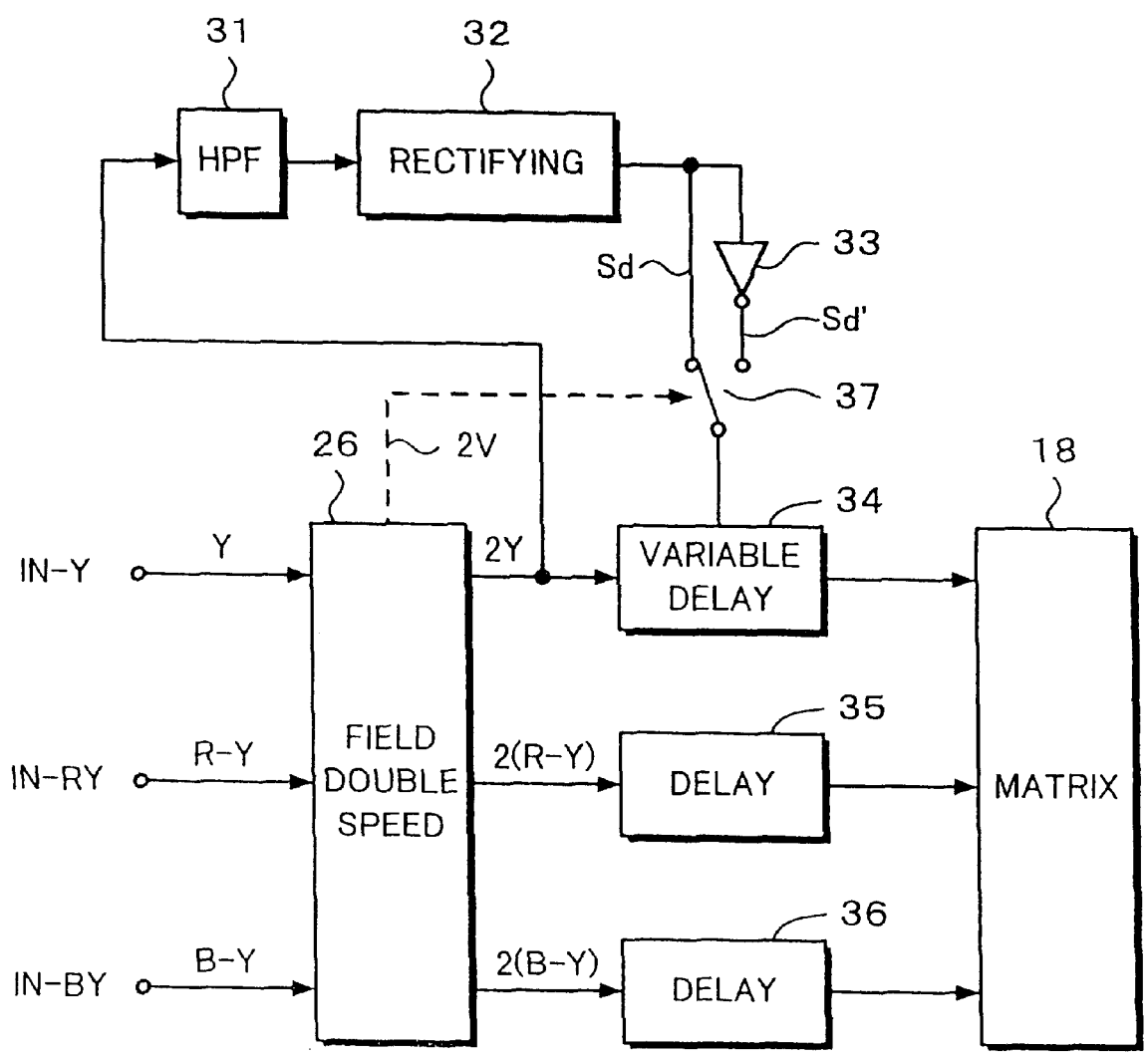
FIG. 9 is a block diagram showing the third example of a construction to detect a front/rear feeling which is applied to the invention.

FIG. 9 shows a block diagram of the third example to add a front/rear feeling in case of operating at a field double speed. The luminance signal Y supplied from the input terminal IN-Y, the color difference signal R−Y supplied from the input terminal IN-RY, and the color difference signal B−Y supplied from the input terminal IN-BY are transmitted to the field double speed circuit 26. The field double speed circuit 26 forms a video signal of the double field frequency from the input video signal as mentioned above.

In this embodiment, the first field (A1, B1, . . . ) in which the pulse signal 2V synchronized with the double speed field is at the high level is used as a video signal for the left eye and the second field (A2, B2, . . . ) in which the pulse signal 2V is at the low level is used as a video signal for the right eye. The field double speed luminance signal 2Y and field double speed color difference signals 2(R−Y) and 2(B−Y) are generated from the field double speed circuit 26.

The double speed luminance signal 2Y is supplied to a variable delay circuit 34 and the double speed color difference signals 2(R−Y) and 2(B−Y) are supplied to fixed delay circuits 35 and 36, respectively. The double speed luminance signal 2Y is supplied to the high pass filter 31 and an output signal of the high pass filter 31 is supplied to the rectifying circuit 32. In a manner similar to the first embodiment, the high pass filter 31 and rectifying circuit 32 generate the detection signal Sd according to an amount of edge information in the luminance signal. The detection signal Sd' which is complementary to the detection signal Sd is formed by the inverter 33.

The detection signals Sd and Sd' are supplied to two input terminals of a switching circuit 37. An output of the switching circuit 37 is supplied to the variable delay circuit 34 as a signal to control the change amount Δx of the delay amount. The switching circuit 37 is controlled so as to transmit the detection signal Sd to the variable delay circuit 34 for a period of time during which the pulse signal 2V is at the high level, namely, for a period of time of the video signal for the left eye and to transmit the detection signal Sd' outputted from the inverter 33 to the variable delay circuit 34 for a period of time during which the pulse signal 2V is at the low level, namely, for a period of time of the video signal for the right eye. In the variable delay circuit 34, therefore, the video signal for the left eye is delayed by the detection signal Sd and the video signal for the right eye is delayed by the detection signal Sd'.

The luminance signal from the variable delay circuit 34 and the two color difference signals from the fixed delay circuits 35 and 36 are supplied to the matrix circuit 18. The three primary color signals 2R, 2G, and 2B of the field double speed are formed by the matrix circuit 18.

Even in the third embodiment shown in FIG. 9, it is also possible to control so as to vary the delay amount of only one of the left-eye video signal and the right-eye video signal and to fix the other delay amount.

Figure 10:
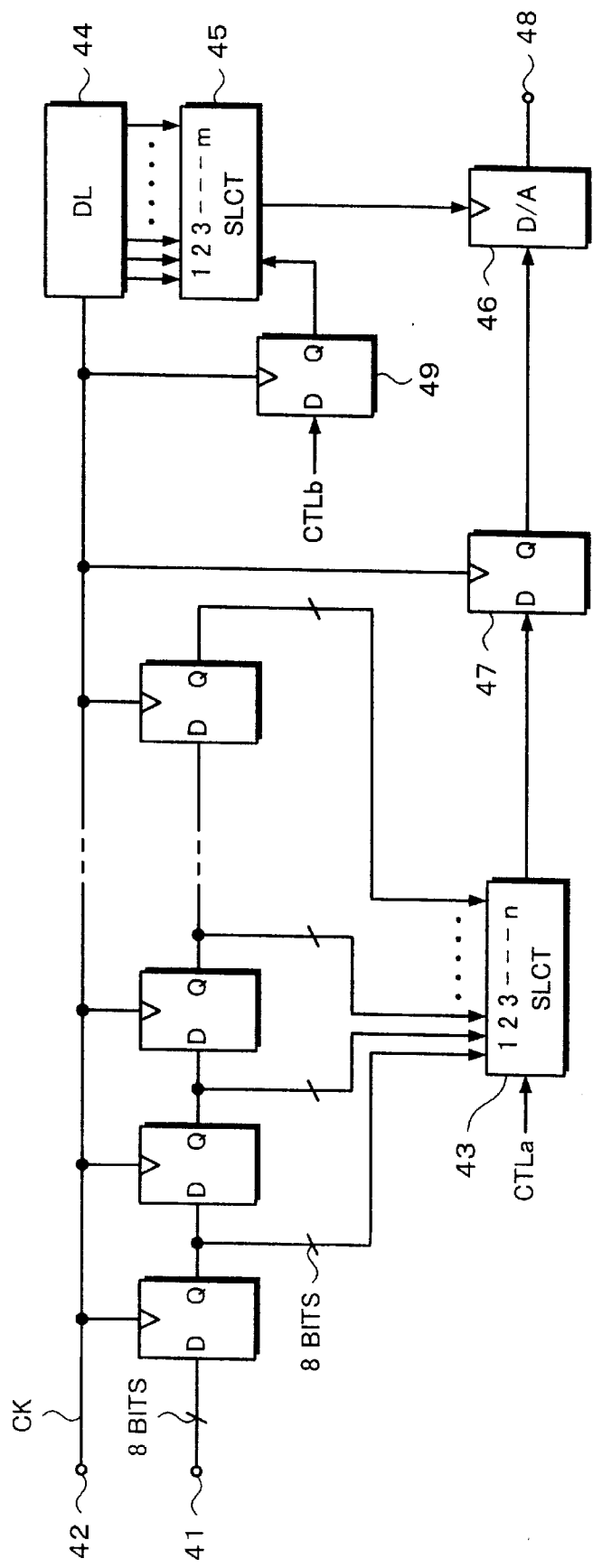
FIG. 10 is a detailed block diagram of an example of a front/rear feeling circuit which is applied to the invention.

As variable delay circuits 34L and 34R, the variable delay circuits with a construction of a digital circuit shown in FIG. 10 can be used. In FIG. 10, a luminance signal converted by an A/D converter (not shown) into a digital signal is supplied to an input terminal 41. The luminance signal is sampled at a predetermined sampling frequency and each sample is converted into data of 8 bits. Reference numeral 42 denotes an input terminal of a sampling clock CK synchronized with the digital luminance signal.

Latches of n stages are serially connected to the input terminal 41. Each latch has a data input terminal D, a data output terminal Q, and a clock terminal. Each output of the latches of n stages (n: 1, 2, 3, . . . , n) is supplied to a selector 43. Outputs of the latches of n stages are outputs delayed by times of T (T: one period of the sampling clock), 2T, . . . , and nT for the input luminance data. Therefore, by selecting one of the input luminance data by the selector 43, the delayed luminance data can be generated for a time that is integer times as long as the clock period T. The selector 43 is controlled by a first control signal CTLa.

The sampling clock CK is supplied to a delay circuit 44. The delay circuit 44 delays the sampling clock CK by the time obtained by dividing one clock period T into small periods. Now, assuming that the time obtained by dividing one clock period to m equal small periods is set to ΔT (m: 1, 2, 3, . . . , m), the delay circuit 44 outputs m sampling clocks having delay amounts of 0, ΔT, 2ΔT, . . . , (m−1)ΔT, respectively.

The delay circuit 44 can have a construction in which a combination of a plurality of delay lines is changed, a construction using a time constant circuit, a construction using a clock of a frequency higher than that of the sampling clock, or the like.

The sampling clock selected by the selector 45 is supplied to a D/A converter 46. A control signal CTLb to select one of the m sampling clocks is supplied to the selector 45 via a latch 49. The digital luminance signal which was selected by the selector 43 and transmitted through a latch 47 is supplied to the D/A converter 46. An analog luminance signal is taken out to an output terminal 48 of the D/A converter 46.

In the foregoing construction shown in FIG. 10, when the delay amount is equal to 0, the control signal CTLa controls the selector 43 so as to select the digital luminance signal having the delay amount of n/2·T and the control signal CTLb controls the selector 45 so as to select the sampling clock having the delay amount of m/2·ΔT. n/2·T and m/2·ΔT denote center values of the variable delay amounts. The center value corresponds to D31 α or D+α mentioned above. In case of the variable delay circuit 34L, the control signals CTLa and CTLb are formed on the basis of the detection signal Sd. In case of the variable delay circuit 34R, the control signals CTLa and CTLb are formed on the basis of the detection signal Sd'.

Since the inverter 33 is provided, the delay amounts which are caused between the variable delay circuits 34L and 34R have the opposite polarities.

That is, when the delay amount of $$(n/2 \cdot T) + a \cdot T + (m/2 \cdot \Delta T) + b \cdot \Delta T$$

is caused in the variable delay circuit 34L, the delay amount of $$(n/2 \cdot T) - a \cdot T + (m/2 \cdot \Delta T) - b \cdot \Delta T$$

is caused in the variable delay circuit 34R. The values of (a·T+b·ΔT) and (−a·T−b·ΔT) correspond to the change amount Δx. The delays by the variable delay circuits 34L and 34R are caused to generate the parallax information and to emphasize the stereoscopic feeling and, actually, it is sufficient to cause a delay amount of about 1 μsec. It is sufficient to set ΔT to about nano seconds.

Figure 11:
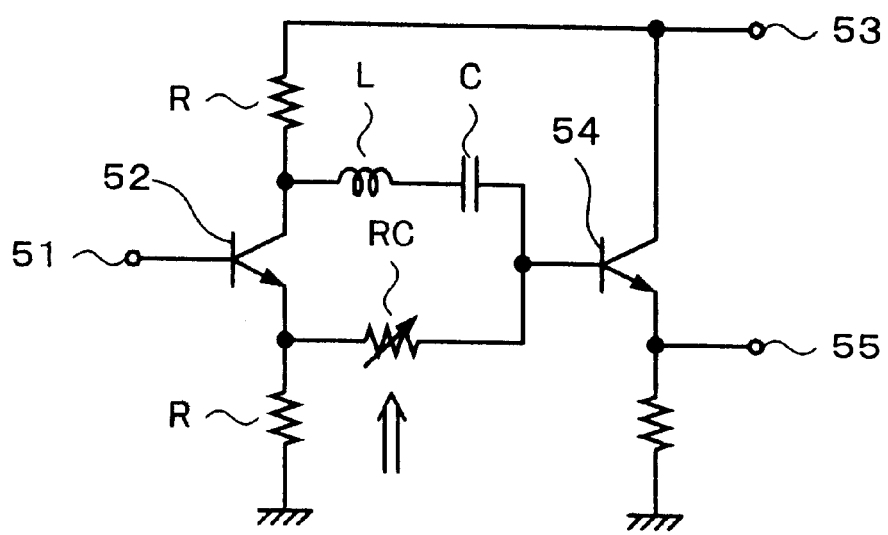
FIG. 11 is a circuit diagram of an example of the front/rear feeling circuit which is applied to the invention.

Each of the variable delay circuits 34L and 34R can be also constructed by an analog circuit shown in FIG. 11. In FIG. 11, an input terminal 51 to which the analog luminance signal is supplied and a base of a transistor 52 are connected. A collector and an emitter of the transistor 52 are connected to a positive power terminal 53 and the ground through resistors R having the same resistance value, respectively. The collector of the transistor 52 is connected to a base of a transistor 54 via a coil L and a capacitor C. A variable resistive element Rc is connected between the emitter of the transistor 52 and the base of the transistor 54 in parallel with a serial circuit of the coil L and capacitor C. A collector of the transistor 54 is connected to the power terminal 53 and an emitter is connected to the ground through a resistor. An output terminal 55 is led out from the emitter.

Luminance signals of opposite phases are generated at the collector and emitter of the transistor 52. A signal phase of a collector output is shifted by the coil L and capacitor C and is synthesized to an emitter output transmitted via the variable resistive element Rc at the base of the transistor 54. Its phase amount, namely, the delay amount α is controlled by a resistance value of the variable resistive element Rc. Therefore, by controlling the resistance value of the variable resistive element Rc in accordance with the analog detection signals Sd and Sd', the delay amount of the luminance signal that is taken out to the output terminal 55 can be controlled.

As variable delay circuits 34L and 34R, various constructions other than the construction shown in FIG. 10 or 11 can be used. For example, a construction of an analog delay circuit comprising a CCD can be used. As another example, a construction of a digital circuit using an RAM can be also used.

As mentioned above, the polarities of the modulation of the left-eye video image and the right-eye video image are reversed, namely, the moving (modulating) directions of the time base are set to the opposite directions. Thus, a binocular parallax that is twice as large as that in case of modulating only the signal of one eye is caused. In the first embodiment, if the foregoing detection amount of the high frequency components is sufficiently large, namely, in case of a focusing area, the object is determined to be a foreground object, thereby displaying the image to the position in front of the display surface. On the contrary, if the detection amount of the high frequency components is small, namely, in case of an area out of the focusing area, the object is determined to be a background object, thereby displaying the image to the position behind the display surface. In other words, the video image of the left eye is moved to the left by only a predetermined amount and the video image of the right eye is moved contrarily to the right by only the predetermined amount. By controlling the change amount Δx by the detection signals Sd and Sd' derived by the detection of the front/rear feeling on the basis of those image shift amounts as references, the display position of the image is modulated to the right and left. A stereoscopic video image which is fused from the right and left video images derived by the above operations is seen as if it was located behind the display surface by a predetermined amount and becomes a video image added with a binocular parallax (front/rear feeling) which is determined by a sharpness of the foregoing image edge on the basis of such a display position as a reference.

Figure 12A:
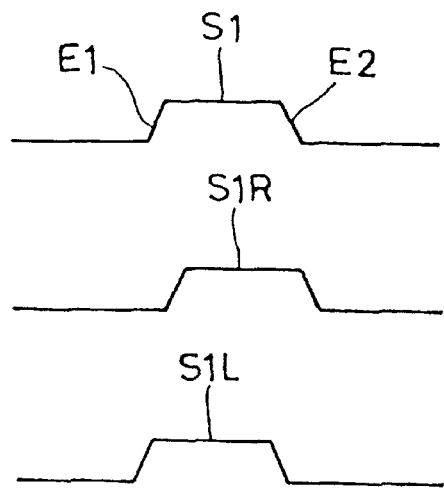
FIGS. 12A and 12B are schematic diagrams for explaining the front/rear feeling operation which is applied to the invention.
Figure 12B:
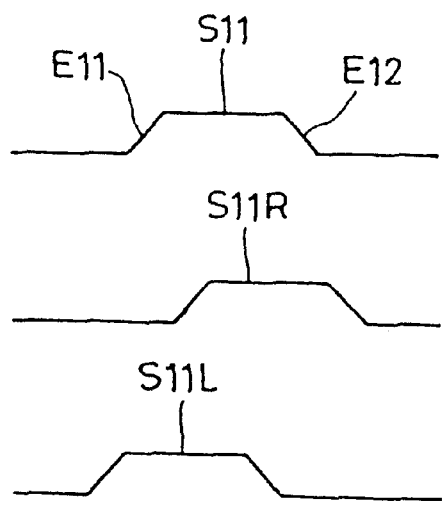

Processes for emphasizing the stereoscopic feeling (front/rear feeling) by the foregoing front/rear feeling and depth feeling circuit 14 will now be described with reference to FIGS. 12A and 12B. In FIGS. 12A and 12B, an axis of abscissa denotes a time base (namely, position in the horizontal direction) and an axis of ordinate indicates a level. Signals Si and S11 shown in FIGS. 12A and 12B are inputs to the variable delay circuits 34L and 34R in the case where (−α+Δx) and (α−Δx) are equal to 0. It is assumed that the signals S1 and S11 are signals which were delayed by the fixed component D of the delay amounts of the variable delay circuits 34L and 34R.

The example of FIG. 12A shows processes to the signal (object) S1 having a large front edge E1 and a rear edge E2 in which inclinations are steep in the input video signal. The signal S1 is supplied to the variable delay circuits 34R and 34L. Outputs of the variable delay circuit 34R having the delay amount of α−Δx and the variable delay circuit 34L having the delay amount of −α+Δx are shown by signals S1R and S1L. The signal S1R is displayed as a right-eye video image 63R to a display surface 61. The signal S1L is displayed as a left-eye video image 63L to the display surface 61. The right-eye video image 63R and left-eye video image 63L displayed on the display surface 61 are projected to a right eye 62R and a left eye 62L and are displayed as shown in a virtual image 64A by the parallel vergence side.

Since the signal S1 shown in FIG. 12A has the large front edge E1 and rear edge E2 in which the inclinations are steep, the large change amount Δx can be set. Thus, as shown in FIG. 12A, a deviation between the right-eye video image 63R and left-eye video image 63L on the display surface 61 decreased. By increasing the value of the change amount Δx as mentioned above, the shift amounts from the reference positions to which ±α were added are large and the parallax information is small. Thus, the virtual image 64A is fused at the position that is fairly projected from a center fusion image plane 65, namely, a position near the display surface 61.

In the example of FIG. 12B, processes for the signal (object) S11 having a front edge E11 and a rear edge E12 in which inclinations are gentle in the input video signal. The signal S11 is supplied to the variable delay circuits 34R and 34L and their output signals are shown by S11R and S11L. The signal S11R is displayed as a right-eye video image 63R to the display surface 61 and the signal S11L is displayed as a left-eye video image 63L to the display surface 61. The right-eye video image 63R and left-eye video image 63L displayed on the display surface 61 are projected to the right eye 62R and left eye 62L and are displayed as shown in a virtual image 64B.

Since the signal S11 shown in FIG. 12B has the front edge E11 and rear edge E12 in which the inclinations are gentle, the change amount Δx is set to a small value. Thus, a deviation between the right-eye video image 63R and left-eye video image 63L on the display surface 61 is large as shown in FIG. 12B. By reducing the value of the change amount Δx as mentioned above, the shift amounts from the reference positions to which ±α were added are small and the parallax information is large. Thus, the virtual image 64B is fused at a position near the center fusion image plane 65.

As mentioned above, the center fusion image plane 65 is set to a position behind the display surface 61 instead of the display surface 61. That is, the left-eye video image 63L is shifted to the left by only a predetermined amount in accordance with the fixed delay amount α, the right-eye video image 63R is shifted contrarily to the right by only the predetermined amount, and the change amount Δx is controlled in accordance with the detection amount obtained by the detection of the front/rear feeling mentioned above, so that the display position of the image is modulated to the right and left.

Specifically speaking, as shown in FIG. 12A, when the signal including the steep large edge is supplied and the image is determined to be the foreground, the change amount Δx is set to a large value and the delay time (D−α+Δx) of the variable delay circuit 34L increases. Therefore, the left-eye video image 63L is shifted to the right on the display surface 61. On the contrary, since the delay time (D+α−Δx) of the variable delay circuit 34R decreases, the right-eye video image 63R is shifted to the left on the display surface 61. Thus, the parallax information decreases and the virtual image 64A is seen as if it was fairly projected from the center fusion image plane 65.

As shown in FIG. 12B, when the signal including the gentle edge is supplied and the image is determined to be the background, the change amount Δx is set to a small value and an increase in delay time of the variable delay circuit 34L is small. Therefore, the shift of the left-eye video image 63L to the right on the display surface 61 is small. On the contrary, since a decrease in delay time of the variable delay circuit 34R is small, the shift of the right-eye video image 63R to the left on the display surface 61 is small. Thus, the decrease amount of the parallax information is small and the virtual image 64B is seen as if a projection amount from the center fusion image plane 65 toward the display surface side 61 is small.

As mentioned above, when comparing the case of the edge of a high sharpness as shown in FIG. 12A with the case of the gentle edge as shown in FIG. 12B, it will be understood that an amount of parallax information in case of the high sharp edge is smaller than that of the latter case in consideration of an overlap amount of the right and left video images. The small amount of parallax information denotes that the video image is fused at a position that is closer to the display surface. As for the video image of the foreground, the parallax information is reduced.

The method of fusing the video image at a position behind the display surface by using the parallel vergence has been described above. Specifically speaking, when the video image is fused by the parallel vergence, the center fusion image plane 65 as a plane (background) corresponding to the rearmost position of the image is set to a reference of the vergence, and the delay amounts are modulated in a manner such that a binocular parallax is applied so that the in-focus edge portion of a high sharpness is located at a position fairly in front of the center fusion image plane as shown in FIG. 12A and that the gentle edge portion is located to a position slightly in front of the center fusion image plane as shown in FIG. 12B.

By changing the amount of parallel vergence of the center fusion image plane serving as a reference ((delay amounts of the variable delay circuits 34L and 34R) ±α), the background (reference) of the fused video image can be shifted to an arbitrary position. For example, if the delay amount α is set to an enough large value, the center fusion image plane is fused to the position fairly behind the display surface. In this case, although the value of the change amount Δx of the binocular parallax derived by the detection of the front/rear feeling does not change, the front/rear feeling (stereoscopic feeling) that is derived is felt largely.

If the absolute value of the delay amount a is reduced in the same polarity as that mentioned above, the image is felt as if the fused video image existed on the display surface 61 as a center. When the delay amount α=0, the background (center fusion image plane 65) is located on the display surface 61 and the image is seen as if the focal point with a sharpness was fused at a position in front of the display surface 61. If the polarity of the delay amount α is set to the polarity opposite to that mentioned above, the whole image is fused at a position in front of the display surface 61. In this instance, the fused video image is seen smaller than the actual size on the display surface (refer to FIG. 1A).

Figure 13B:
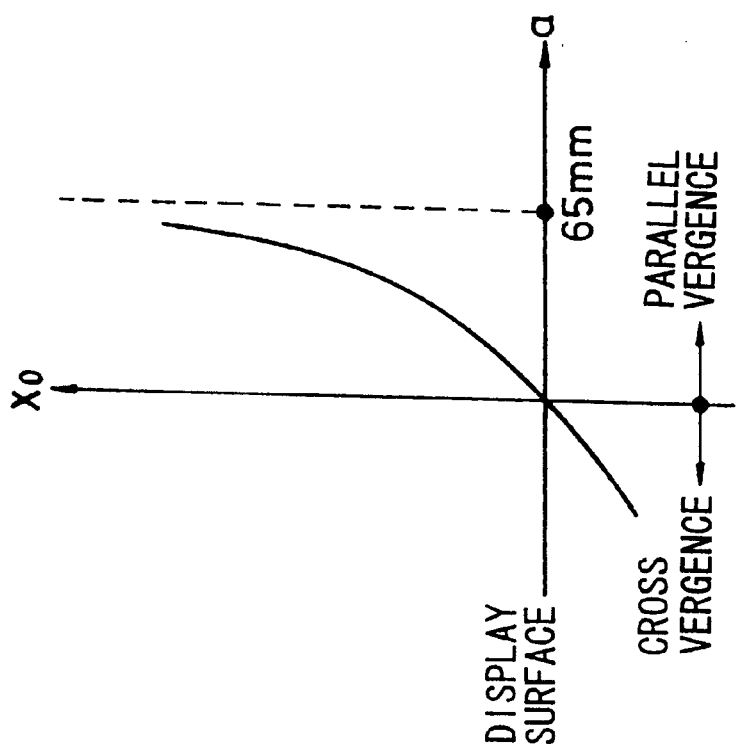
FIGS. 13A and 13B are schematic diagrams for explaining the front/rear feeling operation which is applied to the invention.
Figure 13A:
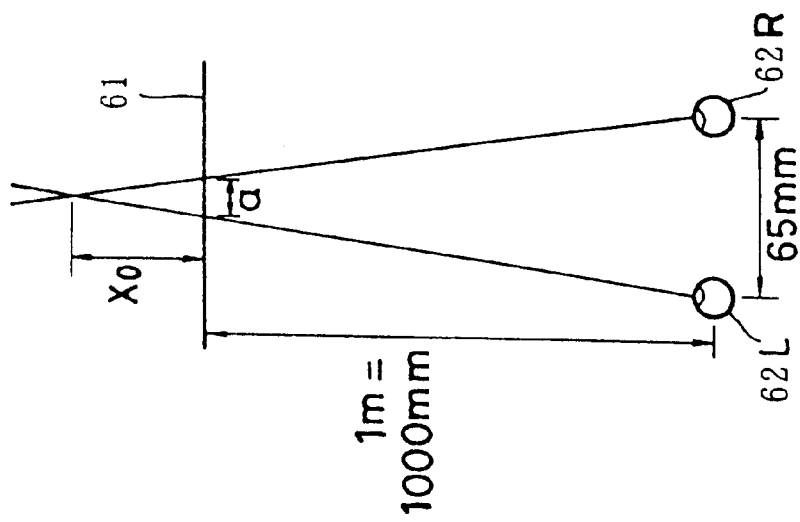

As shown in FIG. 13A, now assuming that a binocular parallax amount on the display surface 61 is set to a and a standard width between the eyes of the human being is equal to 65 mm and a distance between the display surface 61 and a human eye 62 is equal to 1 m (=1000 mm), a depth $X_0$ where the video image is fused is as follows.

$$a/X_0=65/(1000+X_0)$$

Therefore, $$X_0=(1000 \times a)/(65-a)$$

As will be understood from a graph shown in FIG. 13B and will be understood from a relational equation between the binocular parallax a and depth $X_0$ on the display surface 61, when the parallax amount on the display surface 61 decreases from 65 mm and when the binocular parallax amount a is less than 0 (a<0), the vergence is shifted from the parallel vergence to the cross vergence. That is, in a range where the binocular parallax amount a on the display surface 61 satisfies the relation (65 mm≧a>0), the parallel vergence occurs. In a range of (0>a), the cross vergence occurs. As will be understood from FIG. 13B, when the cross vergence occurs, a ratio (namely, sensitivity) of the change of the depth feeling (front/rear feeling) for the binocular parallax a on the display surface 61 decreases. From this reason, in case of using the cross vergence, the front/rear feeling (stereoscopic feeling) obtained by modulating the binocular parallax due to the detection of the front/rear feeling decreases as compared with that in case of using the parallel vergence as in the invention. By varying the vergence amount serving as a reference as mentioned above, a desired video image can be selected.

As mentioned above, when a video image is stereoscopically seen by the cross vergence, the image is seen smaller than the actual size on the display surface and the ratio (namely, sensitivity) of the change in the depth feeling (front/rear feeling) to the binocular parallax amount a on the display surface 61 decreases.

By varying the reference vergence amount as mentioned above, a desired stereoscopic video image can be selected. The reason why the modulation of the time base is not performed to the two color difference signals is because high resolution is unnecessary due to the characteristics to the color difference signals of the eyes. There will be no problem even if a time base modulation similar to that for the luminance (Y) is performed to the two color difference signals.

In the front/rear feeling and depth feeling circuit 14, focusing information or the like can be also used in place of the edge information.

The foregoing front/rear feeling and depth feeling circuit 14 has the construction using the edge information on the basis of the luminance signal. In the invention, the edge information can be also used on the basis of the three primary color signals R, G, and B except for the luminance signal.

Figure 14:
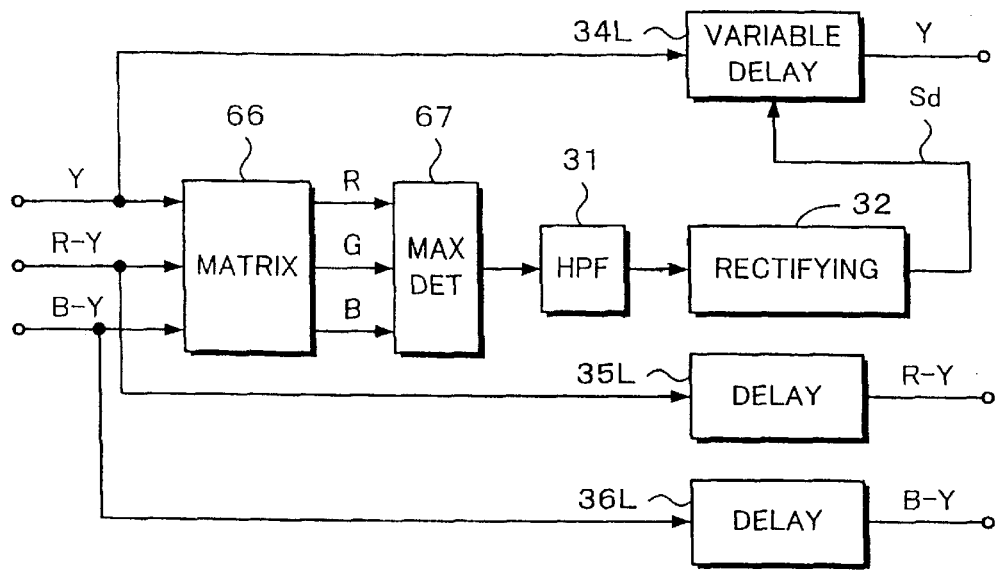
FIG. 14 is a block diagram showing the first example of a construction to detect a front/rear feeling which is applied to the invention.
Figure 15:
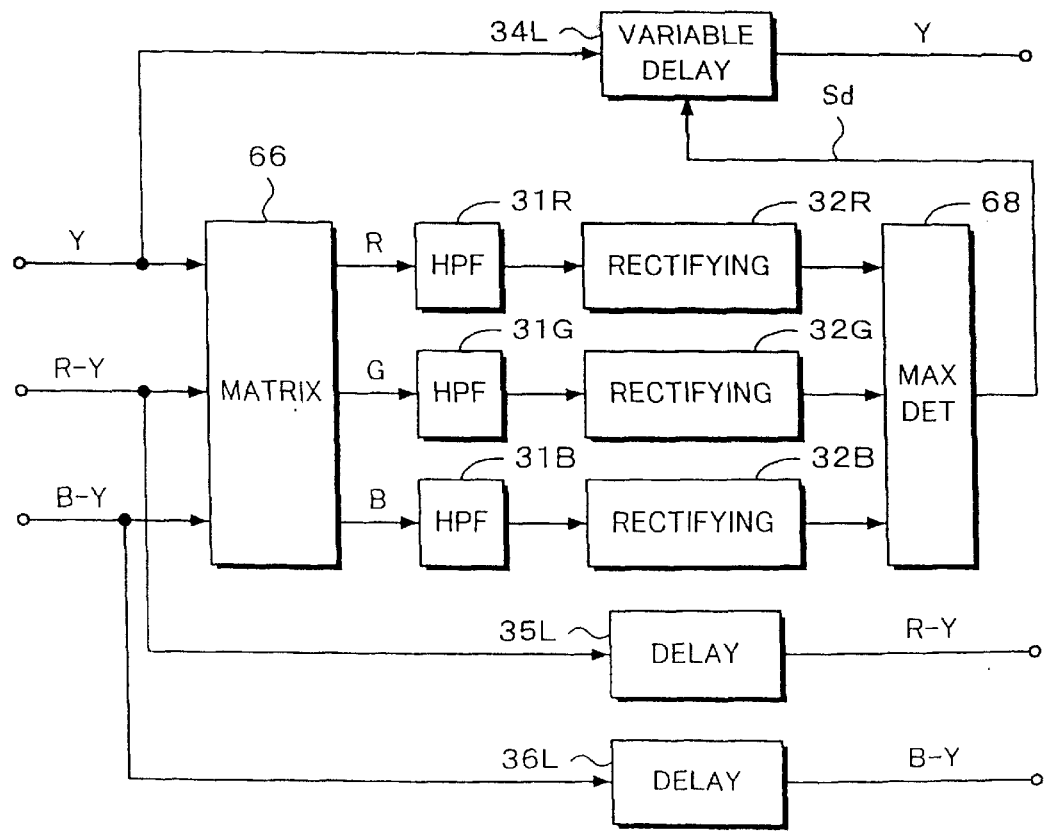
FIG. 15 is a block diagram showing the second example of a construction to detect a front/rear feeling which is applied to the invention.
Figure 16:
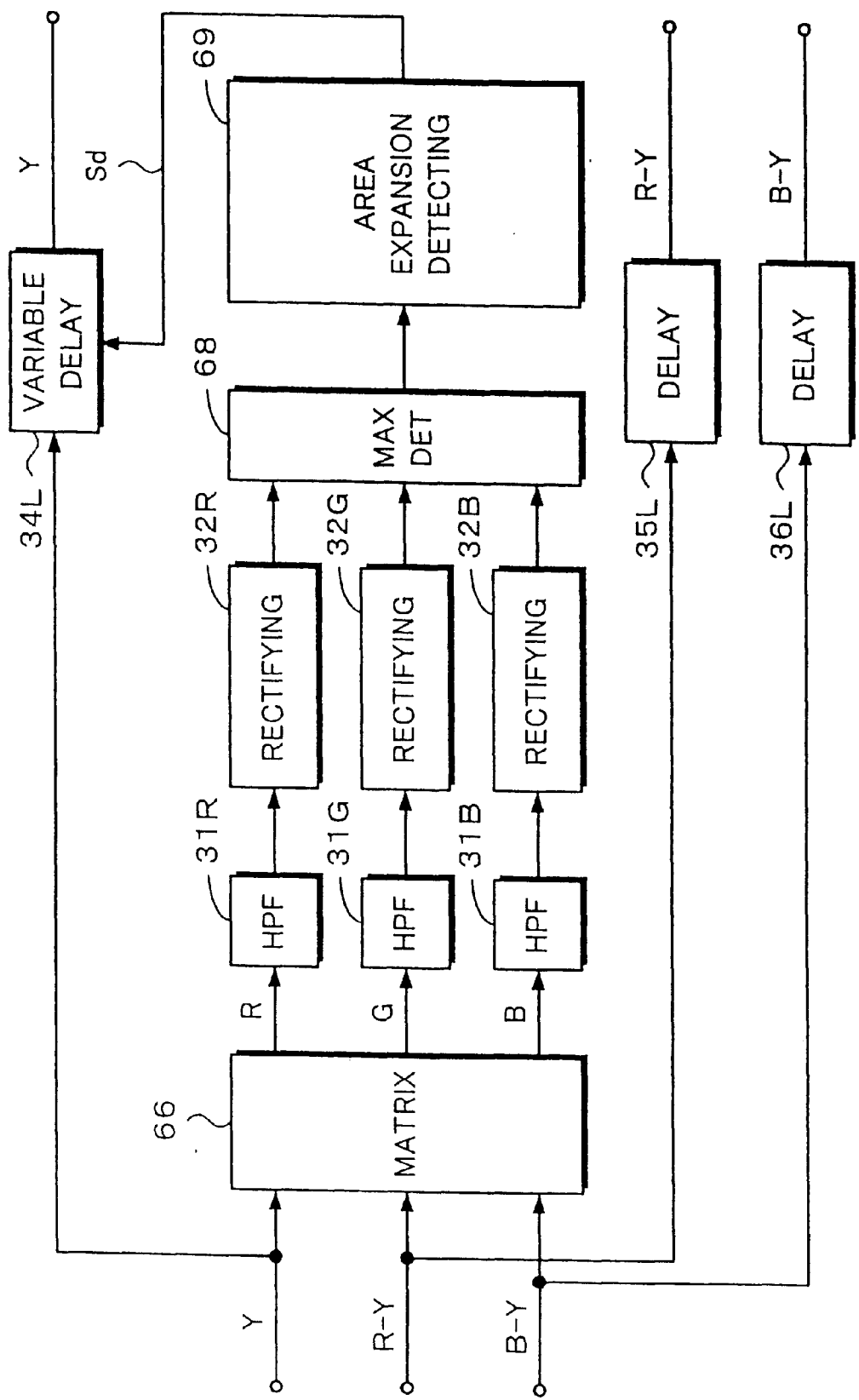
FIG. 16 is a block diagram showing the third example of a construction to detect a front/rear feeling which is applied to the invention.

FIG. 14 shows the first example of the construction to detect the edge information on the basis of the three primary color signals R, G, and B. FIG. 15 shows the second example thereof. FIG. 16 shows the third example thereof. Those three constructional examples are applied to FIG. 7 mentioned above. The luminance signal from the Y/C separating circuit 12 and the two color difference signals from the color demodulating circuit 13 are supplied to a matrix circuit 66.

The three primary color signals R, G, and B generated by the matrix circuit 66 are supplied to a maximum value detecting circuit 67. The maximum value detecting circuit 67 detects the maximum value among the three primary color signals R, G, and B and generates the detected maximum value. An output signal of the maximum value detecting circuit 67 is supplied to the rectifying circuit 32 via the high pass filter 31 and the detection signal Sd is generated from the rectifying circuit 32. The detection signal Sd is formed on the basis of the signal detected as being maximum among the three primary color signals.

The delay amount of the variable delay circuit 34L is controlled by the detection signal Sd from the rectifying circuit 32. As mentioned above, this control is performed so as to emphasize the stereoscopic feeling on the basis of the edge information. The luminance signal Y from the variable delay circuit 34L, the color difference signal (R-Y) from the fixed delay circuit 35L, and the color difference signal (B-Y) from the fixed delay circuit 36L are supplied to the matrix circuit 18. In the construction of FIG. 7, the detection signal Sd is supplied to the variable delay circuit 34R through the inverter.

In the construction shown in FIG. 15, the three primary color signals formed by the matrix circuit 66 are supplied to high pass filters 31R, 31G, and 31B, respectively. Outputs of the high pass filters 31R, 31G, and 31B are supplied to rectifying circuits 32R, 32G, and 32B. Output signals of the rectifying circuits 32R, 32G, and 32B are supplied to a maximum value detecting circuit 68. The maximum value among the output signals of the rectifying circuits 32R, 32G, and 32B is taken out to an output of the maximum value detecting circuit 68 as a detection signal Sd. According to the construction of FIG. 15, a process to form the detection signal is performed on the basis of each of the three primary color signals and the maximum value among the formed signals is outputted as a detection signal Sd.

In the third example shown in FIG. 16, the three primary color signals formed by the matrix circuit 66 are supplied to the high pass filters 31R, 31G, and 31B, respectively, in a manner similar to the case of FIG. 15 mentioned above. The outputs of the high pass filters 31R, 31G, and 31B are supplied to the rectifying circuits 32R, 32G, and 32B, respectively. The output signals of the rectifying circuits 32R, 32G, and 32B are supplied to the maximum value detecting circuit 68. The maximum value among the output signals of the rectifying circuits 32R, 32G, and 32B is detected by the maximum value detecting circuit 68. The detected maximum value is supplied to an area expansion detecting circuit 69 and the detection signal Sd is extracted every area. According to the construction of FIG. 15, a process to form the detection signal is performed on the basis of each of the three primary color signals and the detection signal Sd is formed on the basis of the maximum value among the formed signals.

In the area expansion detecting circuit 69, an area surrounded by external edges of a target object is processed as an area of the target object. That is, in the area expansion detecting circuit 69, a block including the external edges is first detected and an area surrounded by the block including the external edges is subsequently detected. The block including the external edges and the area surrounded by the block including the external edges are combined and are set to the area of the target object. Specifically speaking, the area of the target object is detected from a block magnified to the number MAXH of blocks in the X direction and to the number MAXV of blocks in the Y direction around the fundamental block as a center. Although most of the external edges of the target object are included in the magnified block, in the case where the edges are merely included and it is difficult to include the whole area of the object, the block is again magnified and a process is performed so as to fill the space between the blocks including the external edges.

As mentioned above, in the area expansion detecting circuit 69, in the step of detecting the front/rear feeling from the sharpness of the edge information, when the edge information in which the front/rear feeling was detected is presumed and the block is further expanded, the front/rear feeling is detected on an area unit basis. By giving the binocular parallax every detected area, the front/rear feeling of every area can be obtained. On the basis of the front/rear feeling of every area, the detection signal Sd is outputted from the area expansion detecting circuit 69.

Although the system for detecting the front/rear feeling on the basis of the three primary color signals R, G, and B needs the matrix circuit 66, maximum value detecting circuits 67 and 68, and area expansion detecting circuit 69 as compared with the system for detecting the front/rear feeling from the luminance signal, a more natural front/rear feeling can be caused. The construction shown in FIGS. 14, 15, or 16 can be also applied to the second and third embodiments using the double speed field process without limiting to the first embodiment using the projectors.

Figure 17:
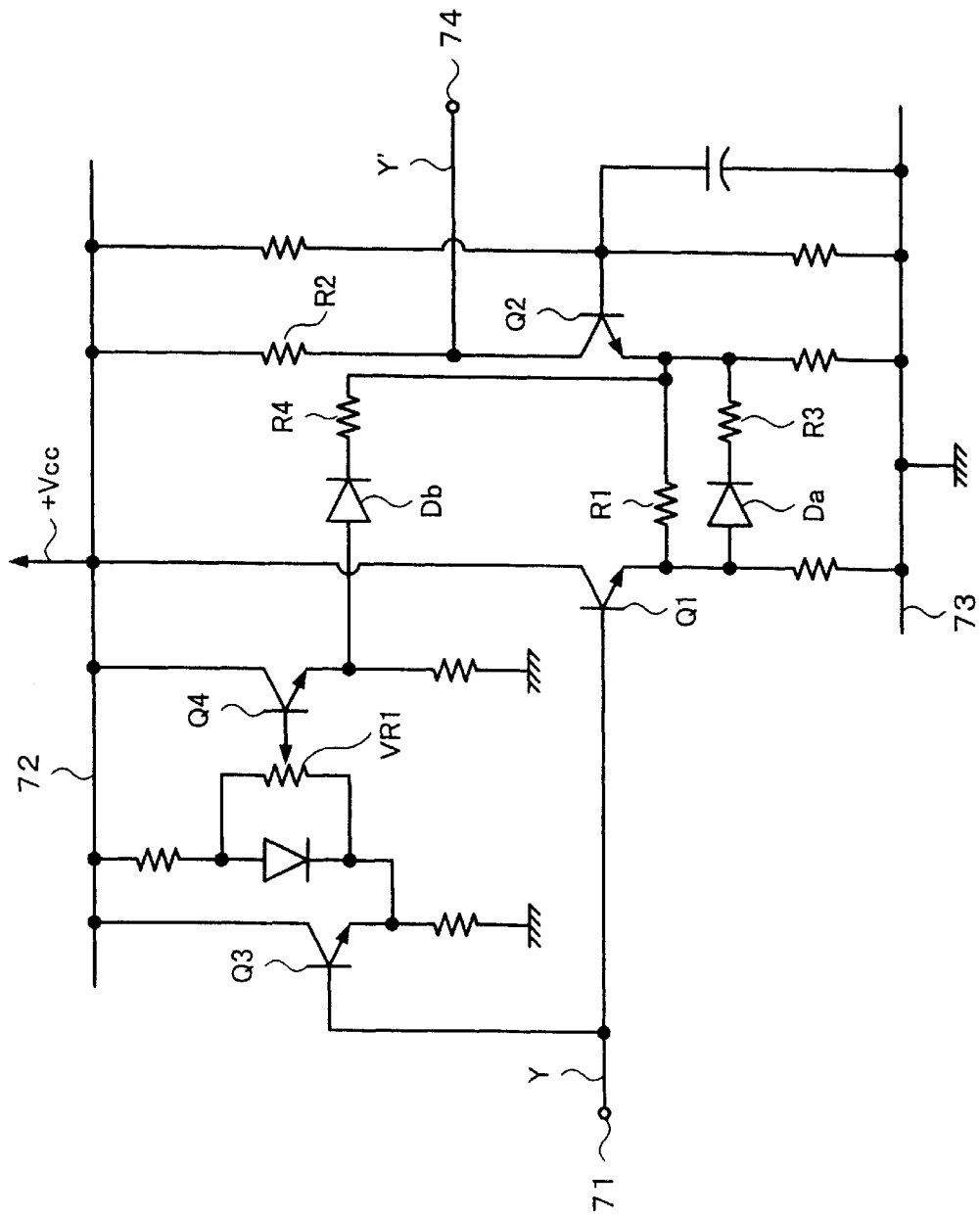
FIG. 17 is a circuit diagram of an example of a glossy feeling circuit which is applied to the invention.

FIG. 17 shows a circuit diagram of an example of the glossy feeling and contrast emphasizing circuit 15. FIG. 17 shows a circuit diagram of the example in case of a stereoscopic display of the 2-projector type. The luminance signal Y separated by the Y/C separating circuit 12 is supplied to an input terminal 71. Reference numeral 72 denotes a power supply line to which a positive power voltage +Vcc is supplied and 73 indicates a ground line. The input luminance signal is supplied to a base of a transistor Q1. A differential amplifier is constructed by transistors Q1 and Q2. Emitters of the transistors Q1 and Q2 are connected through a resistor R1. A serial circuit of a diode Da and a resistor R3 is connected in parallel with the resistor R1. A base of the transistor Q2 is connected to the ground and a collector is connected to the power supply line 72 through a collector resistor R2. A luminance signal Y' after the process is taken out to an output terminal 74 led out from the collector of the transistor Q2.

The input terminal 71 is connected to the base of the transistor Q1 and is connected to a base of a transistor Q4 via a transistor Q3 and a variable resistor VR1 for level shift. The transistor Q4 has a construction of an emitter follower type and its emitter is connected to the emitter of the transistor Q2 via a diode Db and a resistor R4. As diodes Da and Db, diodes in which a forward voltage drop is equal to, for example, 0.6V (corresponding to about 80 IRE of the level of the video signal) are used.

In the construction of FIG. 17, the diodes Da and Db detect a high luminance portion. That is, when the level of the luminance signal is expressed by (0~100) IRE, for example, if the luminance signal Y of a high luminance of 80 IRE or more is supplied, the turn-on of the diode Da is started. For instance, 100 IRE=0.67V. When the luminance signal Y is set to a higher luminance (for example, 90 IRE or more), the turn-on of the diode Db is started.

A gain of the differential amplifier comprising the transistors Q1 and Q2 is determined by a ratio between the emitter resistance R1 and collector resistance R2. When the level of the luminance signal Y is low (when the luminance is not high), the diodes Da and Db are OFF and the gain is decided by the ratio between the emitter resistance R1 and collector resistance R2.

When the luminance signal Y of 80 IRE or more is inputted to the differential amplifier, the turn-on of the diode Da is started. Thus, the emitter resistance decreases from R1 to R1//R3 (// denotes a parallel connection of the resistors). (R1//R3=R1×R3/R1+R3). Therefore, the gain of the differential amplifier increases from R2/R1 to R2/R1//R3. When the luminance signal Y of 80 IRE or more is inputted, thus, the luminance can be further raised. That is, the luminance increases and gamma characteristics can be raised.

Further, when the luminance signal Y of 90 IRE or more is inputted, in addition to the diode Da, the turn-on of the diode Db is also started. Therefore, the emitter resistance is set to R1//R3//R4 and further decreases. (R1//R3//R4=R1×R3×R4/R1×R3+R3×R4+R1×R4). Thus, the gain of the differential amplifier increases to R2/R1//R3//R4. By turning on the diode Db for only the left-eye signal (one field in the double speed), a luminance difference can be given to the right and left eyes. Thus, a glassy feeling can be sensed.

Although the video signal in which the gamma characteristics of the high luminance portion were raised drives the CRT, the CRT has a function to prevent an excessive current from flowing within a predetermined time (ABL (Automatic Beam Limiter) function). When the current of a predetermined value or more flows, a feedback (negative feedback) such as to automatically reduce a DC potential of the driving voltage is applied. An electric potential of the high luminance portion is raised by effectively using the ABL function and, at the same time, the ABL function is made operative to a further increase amount of the luminance, a DC potential in a black portion of a shadow portion is reduced, and a shadow is emphasized, so that the contrast can be enhanced. Consequently, a video image in which a concave/convex feeling (stereoscopic feeling) was emphasized can be realized.

Figure 18:
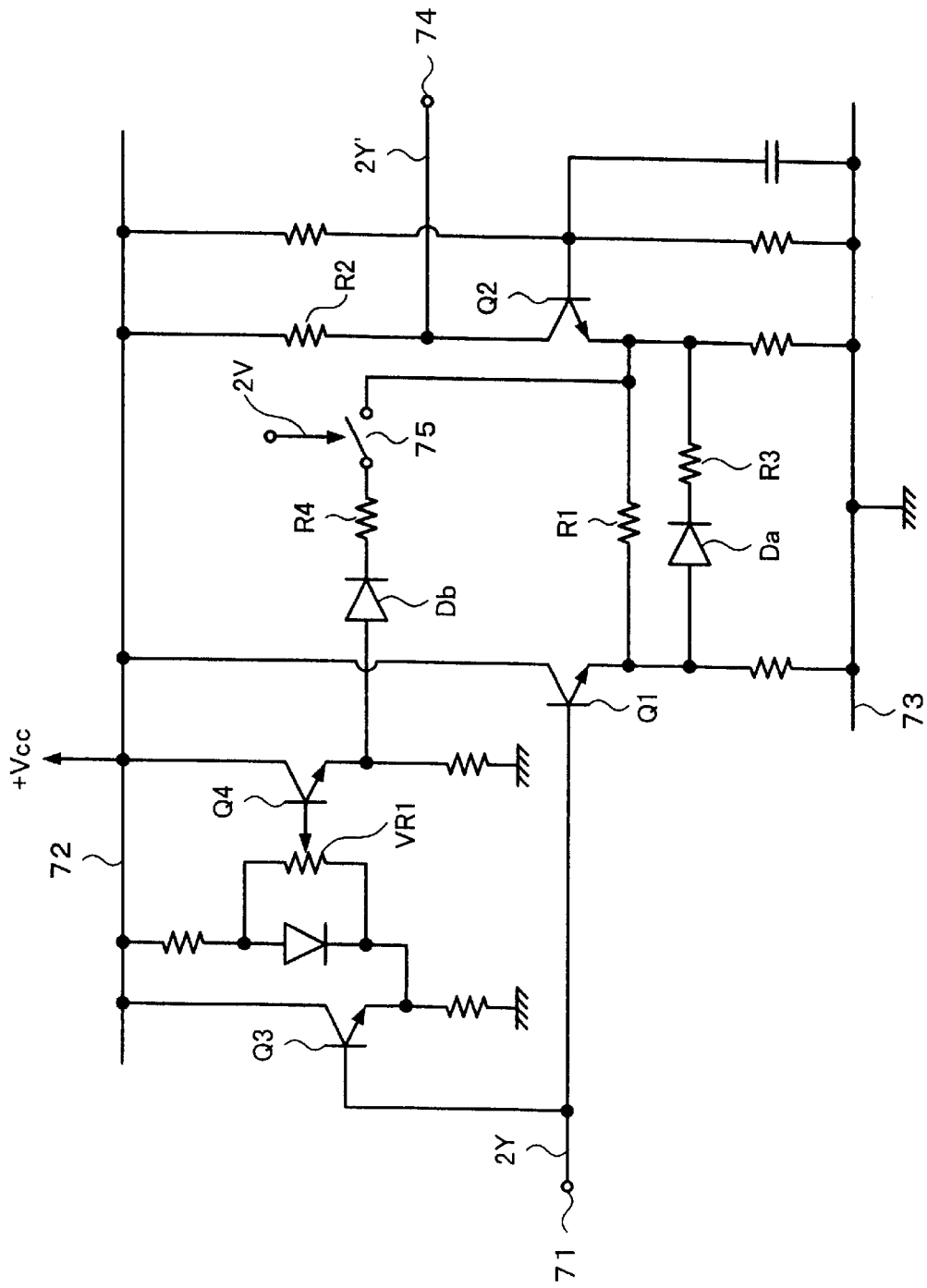
FIG. 18 is a circuit diagram of another example of a glossy feeling circuit which is applied to the invention.

FIG. 18 shows a circuit diagram of another example of the glossy feeling and contrast emphasizing circuit 15. FIG. 18 is a circuit diagram of an example in case of a stereoscopic display using a field double speed CRT. FIG. 18 differs from the construction of FIG. 17 mentioned above with respect to a point that a switching circuit 75 is inserted between the resistor R4 and the emitter of the transistor Q2. The switching circuit 75 is turned on/off by the pulse signal 2V synchronized with the double speed field. That is, for a period of time which corresponds to the period of the left-eye video image and during which the pulse signal 2V is at the high level, the switching circuit 75 is turned on. For a period of time which corresponds to the period of the right-eye video image and during which the pulse signal 2V is at the low level, the switching circuit 75 is turned off.

As mentioned above, as will be understood from the above description, the glossy feeling emphasizing circuit having the switching circuit 75 which is controlled by the pulse signal 2V processes the luminance signal in the following manner. First, a luminance of a portion of a high luminance (80 IRE or more and less than 90 IRE) of each of the luminance signal for the left eye (first field) and the luminance signal for the right eye (second field) is further raised. Moreover, in the portion of a high luminance of 90 IRE or more, the luminance is further raised with respect to only the luminance signal for the left eye. By providing the glossy feeling emphasizing circuit, the stereoscopic feeling and glossy feeling can be emphasized.

In case of performing the field double speed process, since the luminance of only the video image of one field is further raised, a degree of effecting the ABL function to limit the beam current in accordance with a mean value of the beam currents is smaller than that in the case where the field double speed process is not performed and an effect to make the shadow portion dark is weakened. However, on the contrary, since an increase in luminance can be realized, the luminance in the glossy portion is sufficiently raised. Thus, in the glossy area of one field (left-eye video image), the beam is saturated and magnified on the fluorescent surface of the CRT. Since the beam is magnified in the scanning direction, when the luminance of the glossy portion of the left-eye video signal is raised, the center of the glossy portion is shifted in the scanning direction, namely, to the right on the screen. By fusing the left-eye video image to the right-eye video image (video image locating at the original position where it is not saturated), the glossy portion is seen as it is was projected from the periphery. Thus, when the luminance of the left-eye video signal is set to be higher in the glossy portion, the concave/convex feeling is further enhanced. By separating the left-eye video image and the right-eye video image by the glasses with the shutters, the glossy feeling (feeling such that the glossy portion is brilliant) can be emphasized.

In the foregoing invention, the high luminance portion is detected on the basis of the luminance signal which is inputted to the matrix circuit and the level of the luminance signal is raised. Although such a construction can be easily realized on the circuit construction, since the level of only the luminance signal is raised, there is a problem of a decrease in color gain in the high luminance portion.

Figure 19:
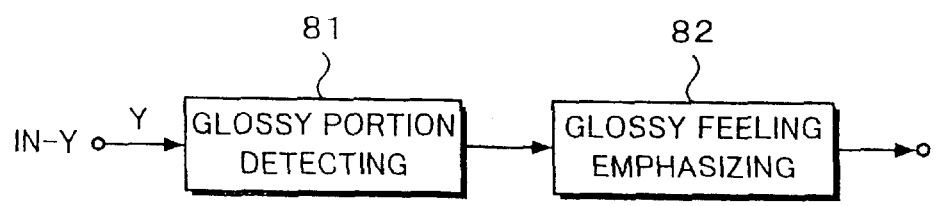
FIG. 19 is a block diagram showing the first example of the glossy feeling circuit which is applied to the invention.

FIG. 19 shows an example of emphasizing the glossy feeling by the glossy feeling and contrast emphasizing circuit 15. The luminance signal Y supplied from the input terminal IN-Y is sent to a glossy portion detecting circuit 81. The glossy portion detecting circuit 81 detects a glossy portion from the supplied luminance signal Y. A glossy feeling emphasizing circuit 82 emphasizes the detected glossy portion and outputs.

Figure 20:
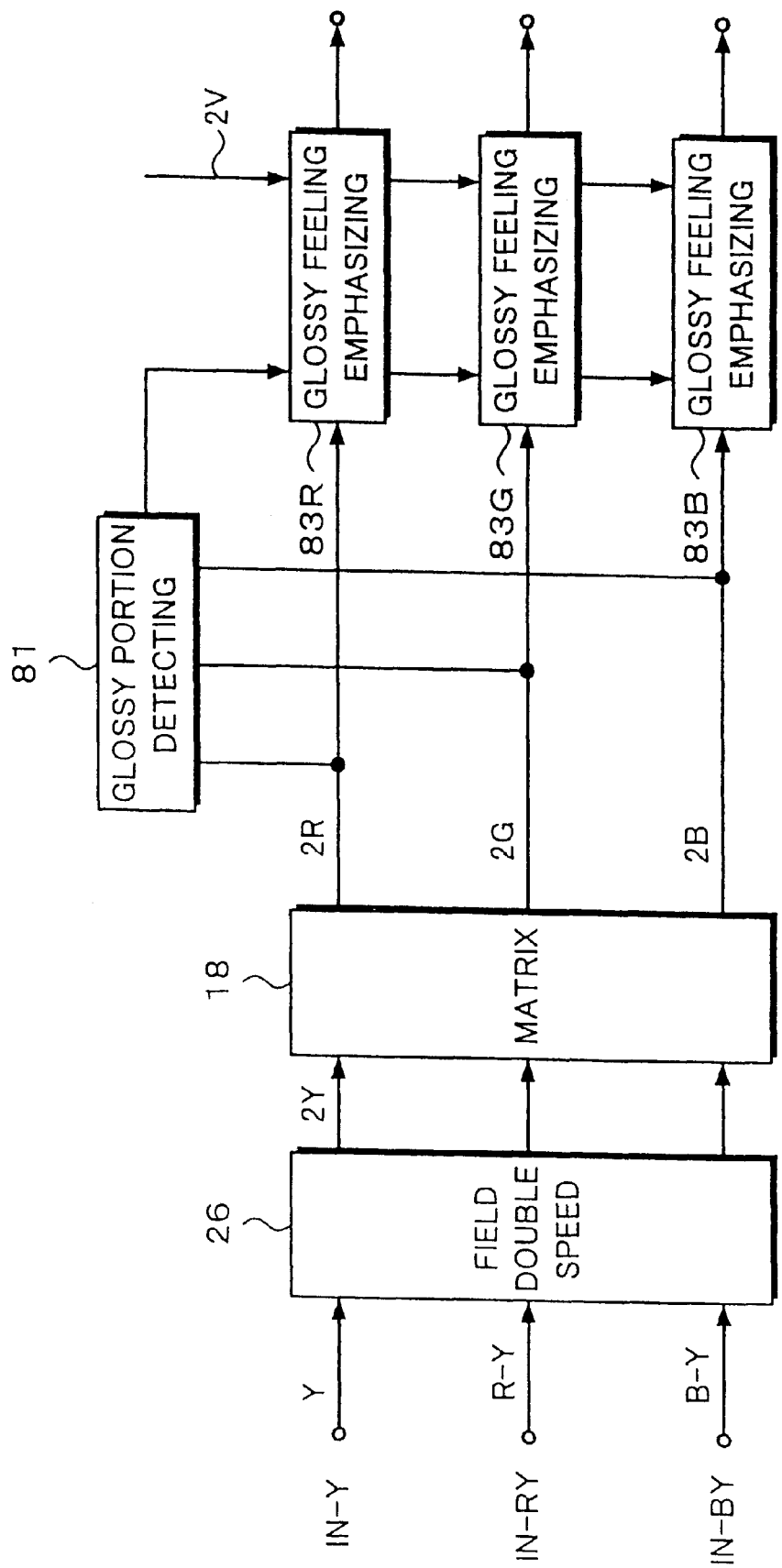
FIG. 20 is a block diagram showing the second example of the glossy feeling circuit which is applied to the invention.

FIG. 20 shows another example of the glossy feeling and contrast emphasizing circuit 15. This another example relates to a case of using the field double speed CRT and the processes for the detection of the high luminance portion and the level emphasis are performed on the basis of the three primary color signals R, G, and B which are generated from the matrix circuit 18 so as not to decrease the color gain. In FIG. 20, reference numeral 81 denotes the glossy portion detecting circuit and 83R, 83G, and 83B indicate glossy feeling emphasizing circuits to perform a process to raise the luminance of the high luminance portion for each of the three primary color signals. The glossy portion detecting circuit 81 detects the high luminance portion by using the luminance signal formed from the three-primary color signals by a matrix arithmetic operation of (Y=0.3R+ 0.59G+0.11B).

The detection signal from the glossy portion detecting circuit 81 and the pulse signal 2V are supplied to the glossy feeling emphasizing circuits 83R, 83G, and 83B. As mentioned above, the high luminance portion within a range of, for instance, 80 IRE or more and less than 90 IRE is set to a high luminance for both of the left-eye and right-eye video signals. The high luminance portion of 90 IRE or more is set to a high luminance for only the left-eye video signal.

Figure 21:
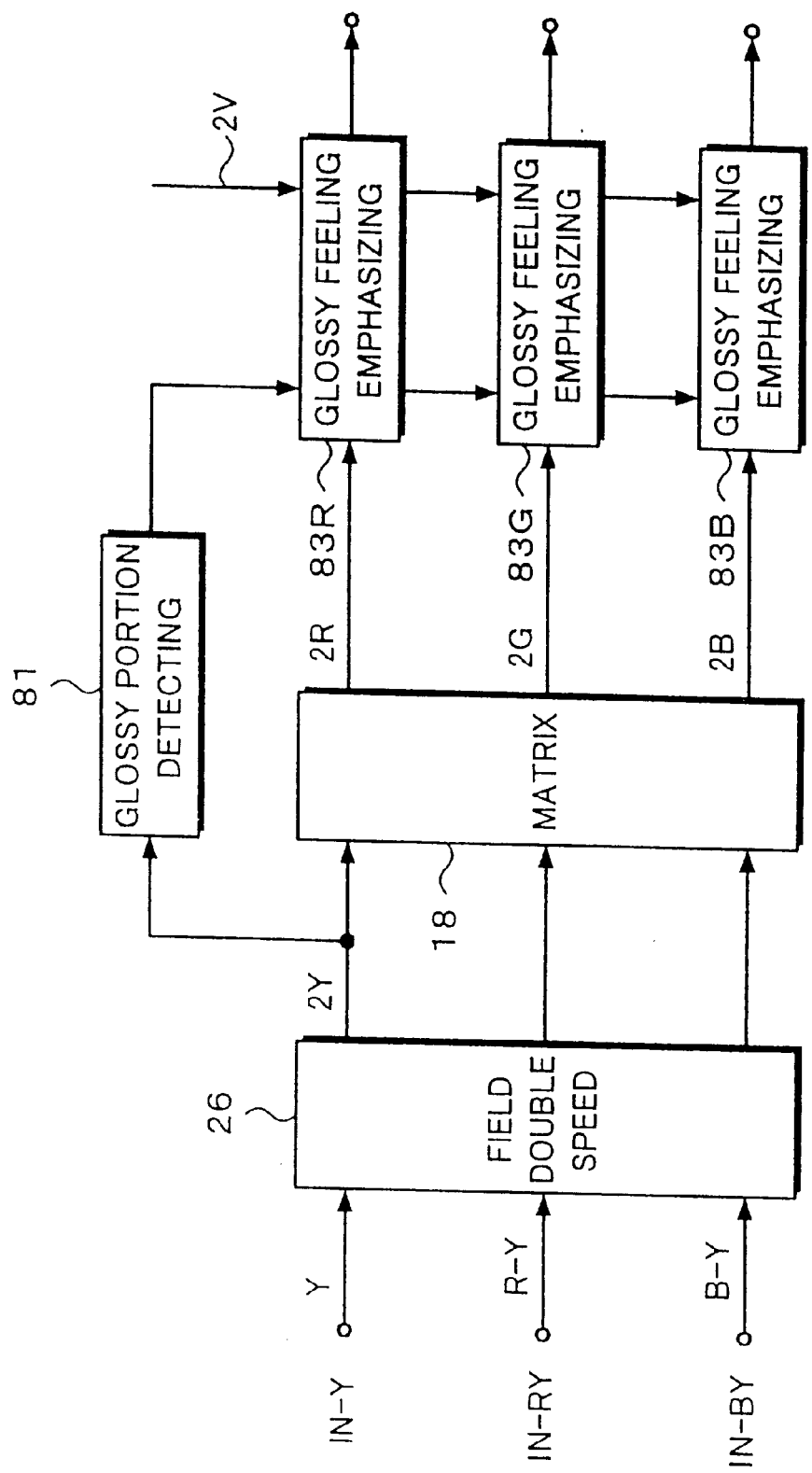
FIG. 21 is a block diagram showing the third example of the glossy feeling circuit which is applied to the invention.

FIG. 21 shows further another example of the glossy feeling and contrast emphasizing circuit 15. The further another example relates to a case of using the field double speed CRT. The glossy portion detecting circuit 81 to which the luminance signal 2Y is supplied is provided and the glossy feeling emphasizing circuits 83R, 83G, and 83B are controlled by the detection signal from the detecting circuit 81. According to the construction shown in FIG. 20 or 21, since the levels of the three primary color signals are controlled, although a scale of the circuit construction is larger than that of the method of controlling only the level of the luminance signal, there is an advantage such that the problem of the decrease in color gain as a result of the control to raise the luminance does not occur. Even in the first embodiment of using the two projectors shown in FIG. 3, the detection of the high luminance portion and the emphasis of the luminance can be performed by using the three primary color signals.

The CRTs 21L, 21R, and 28 are driven by the video signal in which the luminance of the high luminance level portion was further emphasized by the glossy feeling and contrast emphasizing circuit 15 as mentioned above. A protecting function (ABL function) to prevent an excessive current from flowing in a predetermined time is provided for the CRTs 21R, 21L, and 28. When the current of a predetermined value or more flows, the feedback (negative feedback) such as to automatically reduce a DC potential of the driving voltage is applied by the ABL.

Figure 22:
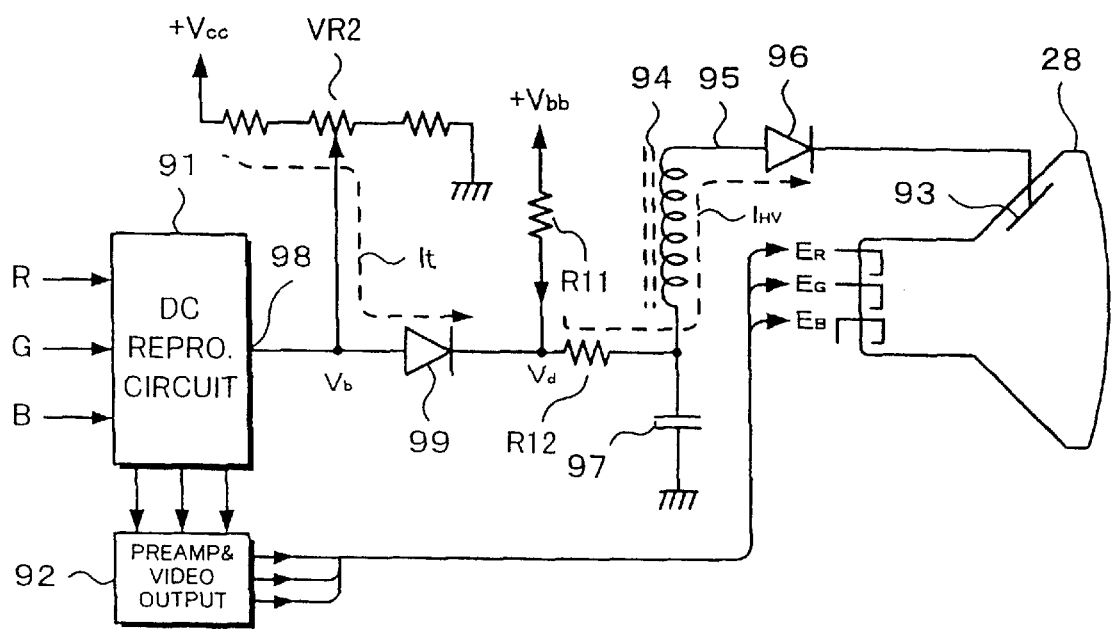
FIG. 22 is a connection diagram for explaining an ABL circuit which is applied to the invention.

FIG. 22 shows an example of an ABL circuit provided for the CRT 28. The three primary color signals are supplied to a preamplifier and video output circuit 92 via a DC reproducing circuit 91. Three primary color signals $E_R$, $E_G$ and $E_B$ from the circuit 92 are sent to three cathodes of the CRT 28, respectively. A high voltage in which a high voltage pulse generated in a high voltage winding 95 of a flyback transformer 94 was rectified by a diode 96 is applied to an anode 93 of the CRT 28.

The high voltage winding 95 is connected to the ground via a capacitor 97. A mean value of the beam currents (hereinafter, simply referred to as a beam current $I_{HV}$) is formed by the capacitor 97. A node between the high voltage winding 95 and capacitor 97 is connected to a terminal of a power voltage +Vbb through a serial circuit of resistors R11 and R12. Further, a resistor serial circuit including the variable resistor VR2 for luminance adjustment is connected between a terminal of a power voltage +Vcc and the ground. A needle of the variable resistor VR2 is connected to a luminance control terminal 98 of the DC reproducing circuit 91 and is connected to a node of the resistors R11 and R12 via a diode 99 in the forward direction. When a control voltage that is supplied to the luminance control terminal 98 drops, a DC component of the signal which is supplied to the CRT 28 decreases, so that the beam current is reduced.

In the construction of FIG. 22, it is now assumed that an electric potential at the node of the resistors R11 and R12 is labeled to Vd and an electric potential (namely, control voltage which is supplied to the luminance control terminal 98 of the DC reproducing circuit 91) at a node between the needle of the variable resistor VR2 and an anode of the diode 99 is labeled to Vb. Since (Vd=Vbb−R11×$I_{HV}$), when the beam current $I_{HV}$ is supplied to the CRT 28 in accordance with the levels of the three primary color signals, the potential Vd drops with an increase in beam current $I_{HV}$. When Vd<Vb, the turn-on of the diode 99 is started. Thus, a shunt current It flowing in the diode 99 is generated and the reduction of the control voltage Vb that is supplied to the luminance control terminal 98 is started. Consequently, the DC component of each primary color signal is reduced and a negative feedback functions so as to reduce the beam current. As mentioned above, a protection to prevent the beam current of a specified value or more from flowing is accomplished by the ABL circuit.

As mentioned above, when the luminance (signal level) of the high luminance portion is raised, the DC potential of the dark portion of the shadow portion is reduced to the black side by the function of the ABL circuit. That is, the portion serving as a shadow of the object can be expressed further in black. Thus, the contrast can be enhanced. A video image in which the concave/convex feeling (stereoscopic feeling) was emphasized as mentioned above can be displayed.

Figure 23:
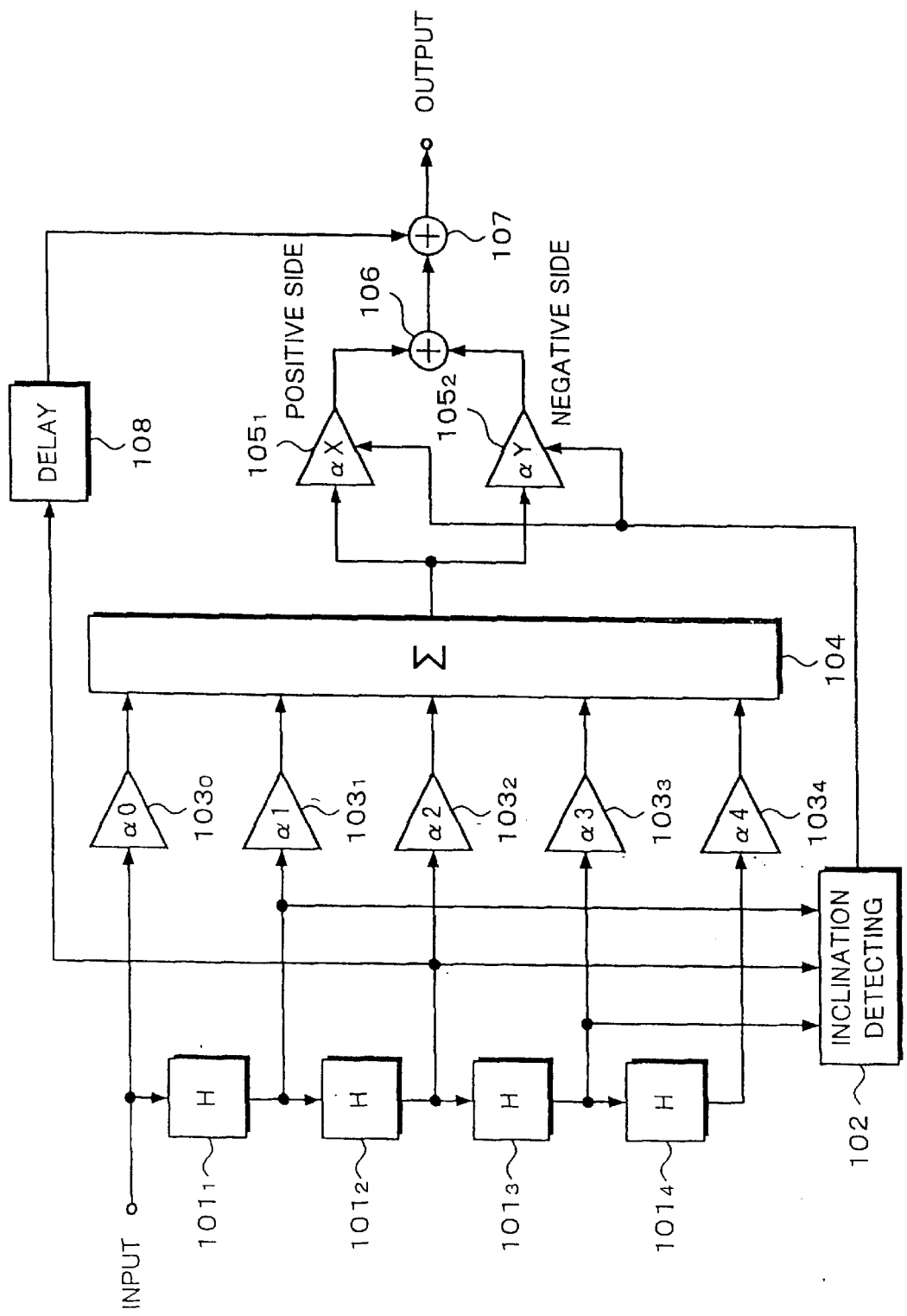
FIG. 23 is a block diagram of an example of a V aperture control circuit which is applied to the invention.

FIG. 23 shows a circuit diagram of an example of a V aperture control of the V aperture control and coring sharpness circuit 16. FIG. 23 relates to an example of five taps. The luminance signal in which the gamma characteristics of the high luminance portion were raised is inputted from an input terminal. The inputted luminance signal is sent to a 1-line delay circuit $101_1$ and a multiplier $103_0$. In the V aperture control, 1-line delay circuits $101_1$ to $101_4$ of four stages are arranged in the vertical direction and multipliers $103_1$ to $103_4$ are connected to outputs of those delay circuits, respectively. The outputs of the 1-line delay circuits $101_1$ to $101_3$ are supplied to an inclination detecting circuit 102. An output of the 1-line delay circuit $101_2$ is supplied to an adder 107. The inclination detecting circuit 102 detects an inclination of the inputted luminance signal, namely, edge information. Multiplication coefficients of multipliers $105_1$ and $105_2$ are varied in accordance with the detected edge information.

In the multipliers $103_0$ to $103_4$, tap coefficients α0 to α4 are multiplied to the supplied luminance signals and multiplication results are supplied to an adding circuit 104. In the adding circuit 104, an addition of delayed five lines is performed every supplied line. An addition result is transmitted to the multipliers $105_1$ and $105_2$. In the multiplier $105_1$, the multiplication is performed, it is controlled by the inclination detecting circuit 102, and a varied multiplication coefficient αX is multiplied to the supplied signal. In the multiplier $105_2$, the multiplication is performed, it is controlled by the inclination detecting circuit 102, and a varied multiplication coefficient αY is multiplied to the supplied signal. In an adder 106, a positive side aperture control component from the multiplier 1051 and a negative side aperture control component from the multiplier $105_2$ are added. The added aperture control signal is supplied to an adder 107. In the adder 107, the outline emphasized aperture control signal from the adder 106 and a signal transmitted from the 1-line delay circuit $101_2$ via a delay circuit 108 to match the horizontal phase with the aperture control signal are added. An addition result is outputted from an output terminal.

Since the light ordinarily enters from the upper position, a shadow is added in the vertical direction in many cases. By raising frequencies in a range from a low band to a middle band of a transient in the vertical direction by using such a nature, the shadow of the light can be effectively raised and a video image having a stereoscopic feeling can be produced. Although it is desirable to have 10 to 20 line memories (1-line delay circuits $101_1$, $101_2$, . . . ) in the vertical direction, enough performance can be derived even if 5 to 7 line memories are used.

Specifically speaking, by changing an applying intensity and characteristics of the aperture control in a trailing edge (portion where it is changed from a bright portion to a dark portion) of an object and a leading edge (portion where it is changed from a dark portion to a bright portion) of the object, an effective emphasis of the shadow is realized. For example, although the aperture control in the trailing edge portion effectively operates, its effect is small in the leading edge portion. The aperture control on the white side causes a brilliant feeling. In consideration of the above principles, by changing the intensities of the aperture control in the leading and trailing edge portions or by changing the intensities on the white side and the black side, the effective V aperture control is realized.

Figure 24A:
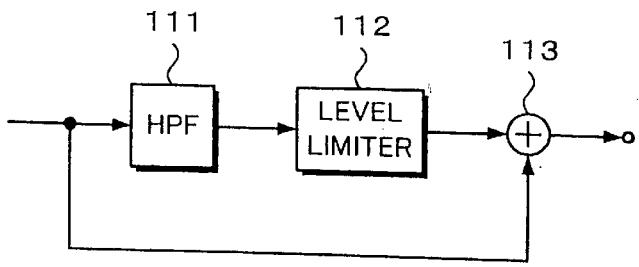
FIGS. 24A to 24D are block diagrams of an example of a coring sharpness circuit which is applied to the invention.
Figure 24B:
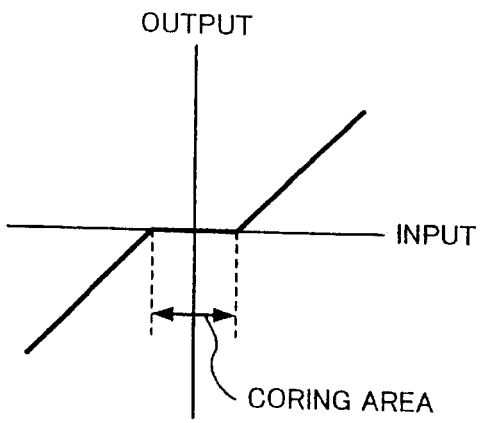
Figure 24C:
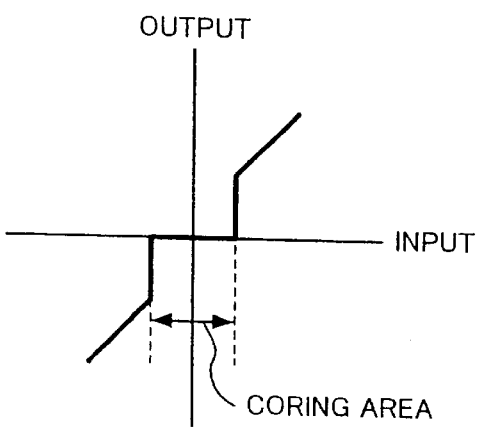
Figure 24D:
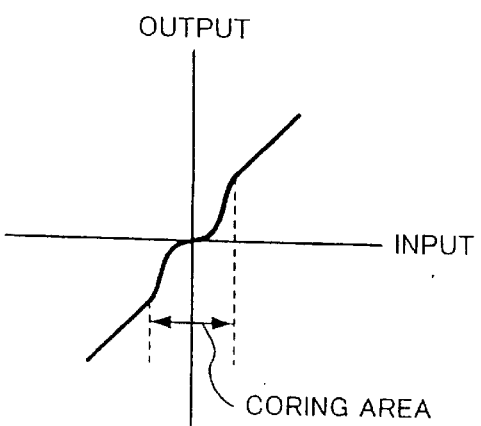

FIG. 24A shows a circuit diagram of an example of a coring sharpness of the V aperture control and coring sharpness circuit 16. The luminance signal is supplied to an HPF 111 via an input terminal. In the HPF 111, high frequency components are extracted from the supplied luminance signal. The signal corresponding to the high frequency components extracted is supplied to a level limiter 112. Only a signal of a relatively large amplitude is extracted from the supplied signal by the level limiter 112. FIGS. 24B, 24C, and 24D show examples of characteristics of the level limiter 112. In an adder 113, the signal for sharpness from the level limiter 112 and the signal from the input terminal are added and an addition result is outputted as an output of coring sharpness from an output terminal.

Specifically speaking, in many cases, a frequency component of the edge portion of the object in which a camera is in-focused is high and an amplitude of the edge component is high. By using such a nature, a sharpness according to the amplitude component is added to only an edge in which the frequency component is large and the amplitude component is relatively large. Thus, a video image in which an edge of the in-focused object was emphasized is obtained and a stereoscopic feeling is expressed.

Figure 25:
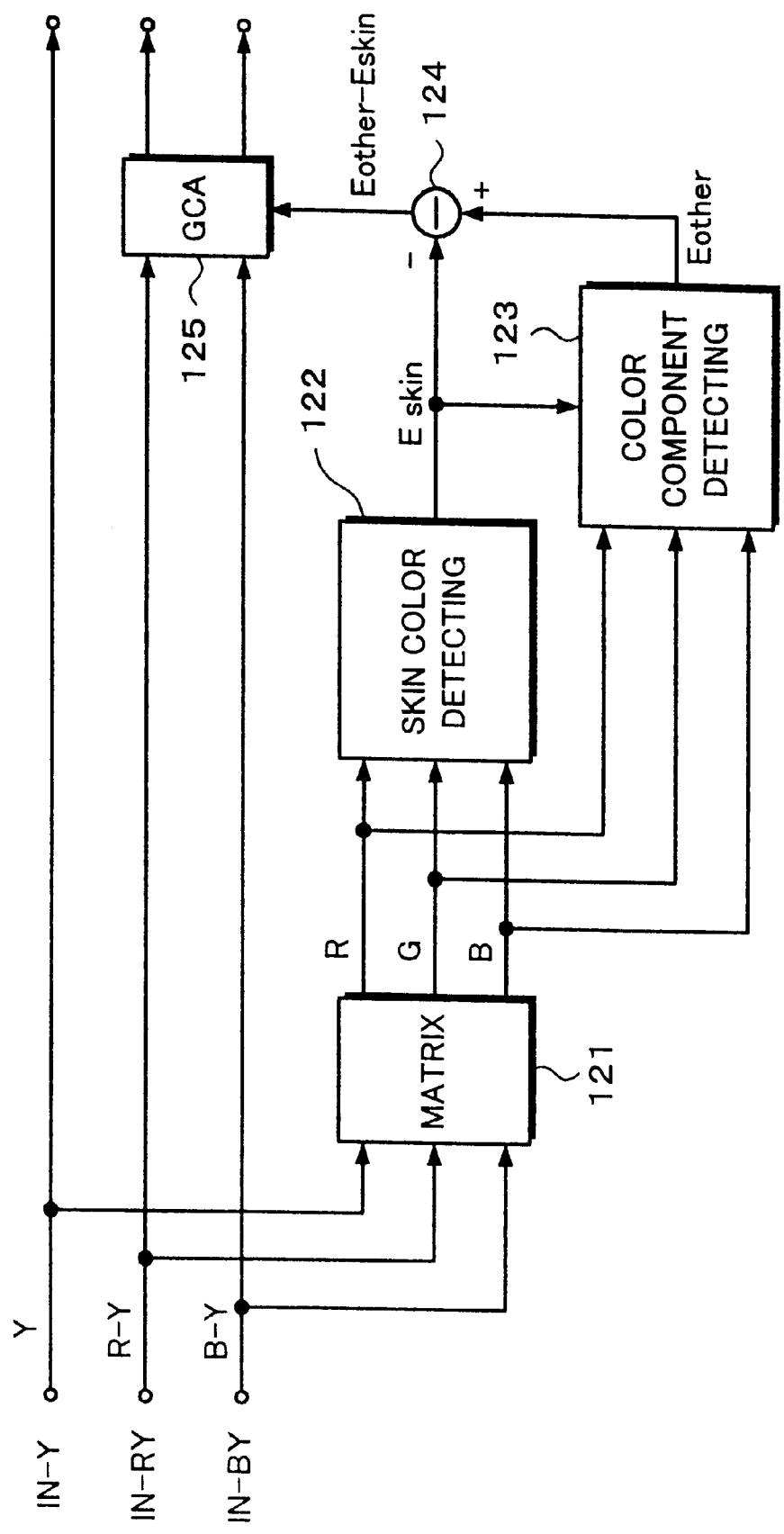
FIG. 25 is a block diagram for explaining a color emphasizing circuit which is applied to the invention.

An example of a construction of the color emphasizing circuit 17 will now be described with reference to FIG. 25. The luminance signal Y which is supplied from the input terminal IN-Y, the color difference signal R-Y which is supplied from the input terminal IN-RY, and the color difference signal B-Y which is supplied from the input terminal IN-BY are transmitted to a matrix circuit 121. Three primary color signals R, G, and B are formed from the supplied luminance signal Y and two color difference signals R-Y and B-Y by the matrix circuit 121. Such signal processes are similar to those in the well-known television receiver. Audio signal processes are omitted here for simplicity of explanation.

The three primary color signals R, G, and B outputted from the matrix circuit 121 are supplied to a skin color detecting circuit 122 and are also supplied to a color component detecting circuit 123. The skin color detecting circuit 122 detects whether the supplied three primary color signals R, G, and B construct a skin color component or not by a predetermined method. Although the details will be explained hereinlater, when a ratio among the three primary color signals R, G, and B is set to a predetermined ratio, it is determined that the color shown by the three primary color signals R, G, and B is a skin color and that the signals R, G, and B construct the skin color component. The detected skin color component is converted into, for example, a voltage and is outputted as a voltage $E_{skin}$. That is, whether they construct the skin color component or not depends on the ratio of the signals R, G, and B and is not influenced by the absolute values. Therefore, in case of a darker skin color, the value of voltage $E_{skin}$ is also reduced. The voltage $E_{skin}$ is supplied to one input terminal of a subtractor 124 and is also supplied to the color component detecting circuit 123.

The color component detecting circuit 123 detects color components other than the skin color components on the basis of the three primary color signals R, G, and B and voltage $E_{skin}$. The detected other color components are converted into, for example, a voltage and are outputted as a voltage $E_{other}$. When an area to be detected corresponds to the skin color component, the voltage $E_{other}$ is set to 0. In case of the color components different from the skin color component, the voltage $E_{other}$ is generated on the basis of a degree of the other color components. The voltage $E_{other}$ is supplied to the other input terminal of the subtractor 124.

In the subtractor 124, the voltage $E_{skin}$ is subtracted from the voltage $E_{other}$. A subtraction result is supplied as a control voltage to a gain control amplifier (GCA) 125. When the color of the area where the detection was performed relates to the skin color component, the voltage $E_{other}$ is set to 0 and a subtraction result is set to the voltage $E_{skin}$. When the detected area relates to the color components other than the skin color, the voltage $E_{other}$ is generated and a subtraction result of the subtractor 124 is set to a value higher than that in case of only the voltage $E_{skin}$. A gain of the GCA 125 is changed in accordance with the voltage derived by the subtraction result. That is, when the subtraction result indicates the voltage $E_{skin}$, the gain is set to 1. When it indicates the voltage $E_{skin}$ or more, the gain is increased in association with the voltage value.

Figure 26:
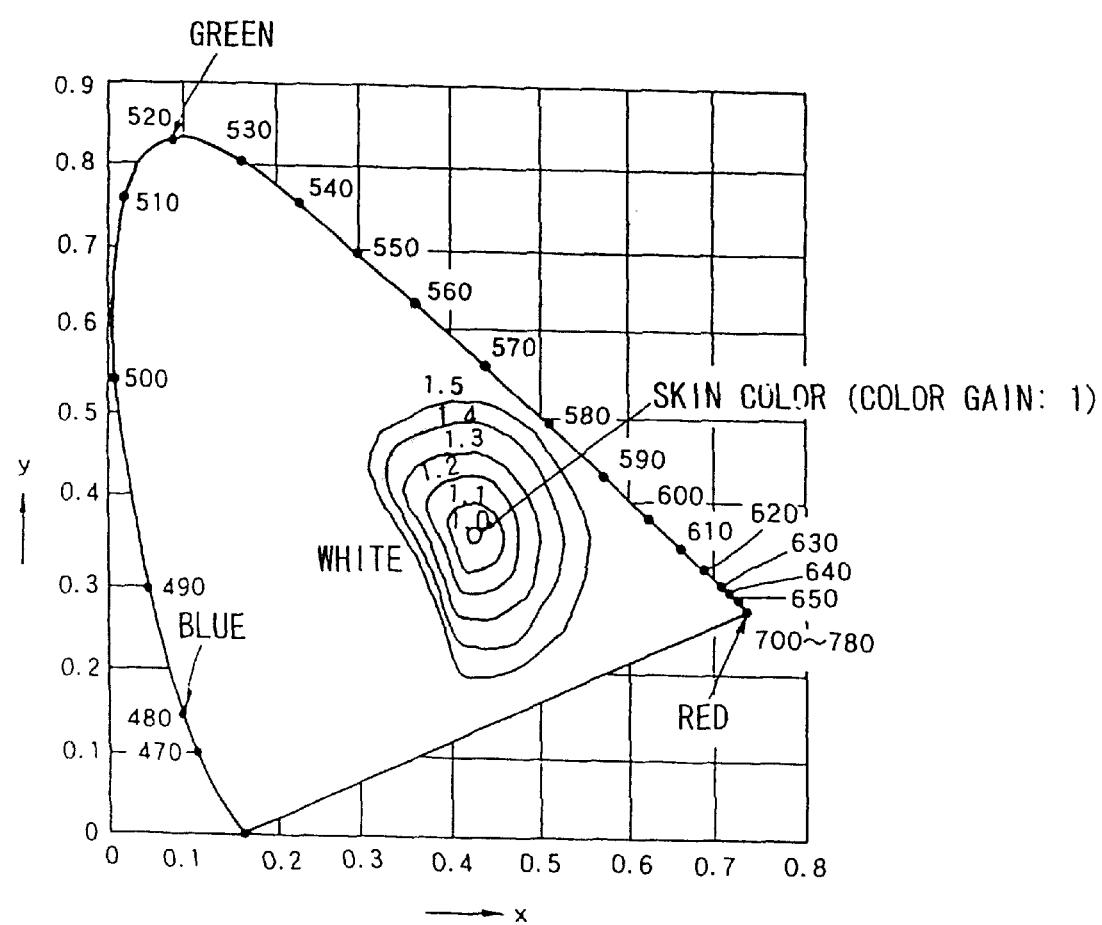
FIG. 26 is a diagram in which an example of an area where a gain of a GCA is increased is illustrated on an x-y chromaticity diagram.

FIG. 26 shows an example of an area where the gain of the GCA 125 is increased on an x-y chromaticity diagram. The gain is set to 1 in an area shown as a skin color in the diagram. As the detected color components are more away from the skin color area on the chromaticity diagram, the gain is increased more. In this case, the gain is increased from 1 to 1.5. A degree of increase of the gain is made different depending on the direction when it is away from the skin color area on the chromaticity diagram.

With this method, the color gain is set to 1 in the area detected to be the skin color in the image and the color gain is increased on the basis of the voltage value of the voltage $E_{other}$ in the area other than the skin color area. Therefore, the color gain can be raised in the area other than the area where it is detected to be the skin color in the image, so that the color contrast can be enhanced in the area other than the skin color area.

A method of generating the voltages $E_{skin}$ and $E_{other}$ will now be described with reference to FIGS. 27 and 28. An arbitrary color is determined by amounts of R (red), G (green), and B (blue) constructing three primary colors. Therefore, for example, in the video signal comprising the signals of three primary colors, the color is decided on the basis of the values of the voltages $E_R$, $E_G$, and $E_B$ corresponding to R, G, and B, respectively.

It is known that when there are specific relations among the R, G, and B colors, the relevant color is the skin color. For example, when the ratio of the R, G, and B colors is equal to 1.64:1.51:1, the color is decided to be the skin color. In another example, when R:G:B is equal to 1.43:1:1, the color is determined to be the skin color. In this instance, R:G:B=1.64:1.51:1 is defined as a skin color. That is, in the video signal, when the ratio of the voltages $E_R$, $E_G$, and $E_B$ is equal to 1.64:1.51:1 the color which is displayed is sensed as a skin color.

Now, a viewpoint is changed and it is considered that an arbitrary color is constructed by the skin color component and the other color components. In this case, when the skin color component is labeled to $C_{skin}$ and the other color components are labeled to $C_{other1}$ and $C_{other2}$, respectively, the conversion from arbitrary colors R, G, and B into the colors $C_{skin}$, $C_{other1}$, and $C_{other2}$ based on the skin color component is satisfied. When it is applied to the video signal, now assuming that the voltage of the skin color component is set to $E_{skin}$ and the voltages of the other color components are set to $E_{other1}$ and $E_{other2}$, this means that the voltages $E_R$, $E_G$, and $E_B$ corresponding to an arbitrary color can be converted into the voltages $E_{skin}$, $E_{other1}$, and $E_{other2}$ based on the skin color component.

The skin color component is obtained by the skin color detecting circuit 122. The skin color detecting circuit 122 comprises, for example, an analog arithmetic operating unit and the skin color component is detected, for example, in the following manner. The voltages $E_R$, $E_G$, and $E_B$ of the colors in case of the skin color are set to $K_R$, $K_G$, and $K_B$. As mentioned above, since the ratio of R:G:B of the skin color component is set to 1.64:1.51:1, there are the relations of $K_R > K_G > K_B$. Therefore, by normalizing them by $K_B$ in which the amplitude is the minimum, the following is obtained.

$$K_R : K_G : K_B = K_R' : K_G' : 1$$

By normalizing $E_R$, $E_G$, and $E_B$ by $K_R'$ and $K_G'$, $E_R'$, $E_G'$, and $E_B'$ are obtained as follows.

$E_R' = E_R / K_R'$ $$E_G{'}=E_G/K_G{'}$$
$$E_B{'}=E_B$$

That is, in case of the skin color, $E_R{'}:E_G{'}:E_B{'}=1:1:1$. FIG. 27 shows an example of $E_R{'}$, $E_G{'}$, and $E_B{'}$ by normalizing the three primary color signals $E_R$, $E_G$, and $E_B$ of the skin color shown on the left side in the diagram by $K_R{'}$ and $K_G{'}$.

As mentioned above, an arbitrary color is normalized by the ratio $K_R{'}$, $K_G{'}$, and $K_B{'}$ (=1) of the colors of R, G, and B in the skin color and the minimum value among the values obtained is set to the skin color component. That is, as shown in FIG. 27, the voltage value $E_{skin}$ corresponding to the skin color component is obtained by $$E_{skin}=\min(E_R{'}, E_G{'}, E_B{'})$$

Figure 27:
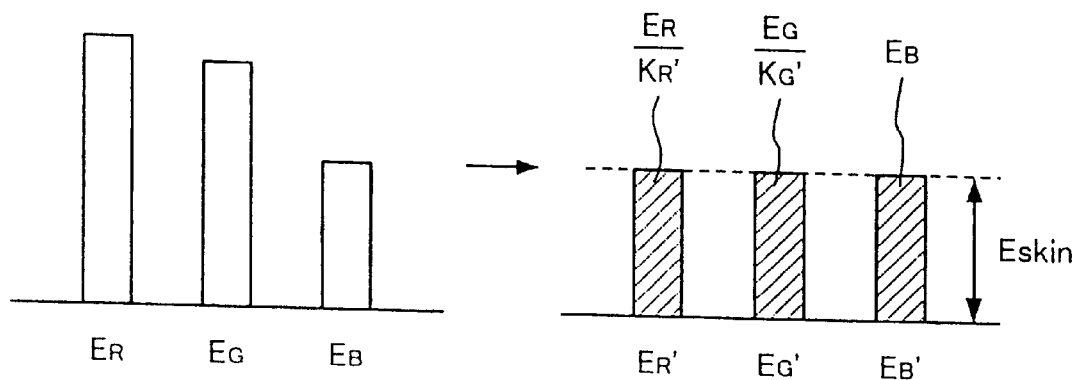
FIG. 27 is a schematic diagram for explaining a forming method of a voltage Eskin and a voltage $E_{other}$.

When the target color is the skin color, as shown on the right side in FIG. 27, $$E_{skin}=E_R{'}=E_G{'}=E_B{'}$$

The color components other than the skin color are obtained by the color component detecting circuit 123. The color component detecting circuit 123 comprises, for instance, an analog arithmetic operating unit. The detection of the color components other than the skin color is performed by a method whereby $E_{skin}$ is subtracted from each of $E_R{'}$, $E_G{'}$, and $E_B{'}$ and subtraction results are added. That is, the voltage value $E_{other}$ corresponding to the other color components is obtained by $$E_{other}=E_R{'}+E_G{'}+E_B{'}-3\min(E_R{'}, E_G{'}, E_B{'})$$

In the following description, "the voltage value $E_{skin}$ corresponding to the skin color component" is referred to as "skin color component $E_{skin}$" and "the voltage value $E_{other}$ corresponding to the other color components" is referred to as "other color component $E_{other}$".

Figure 28A:
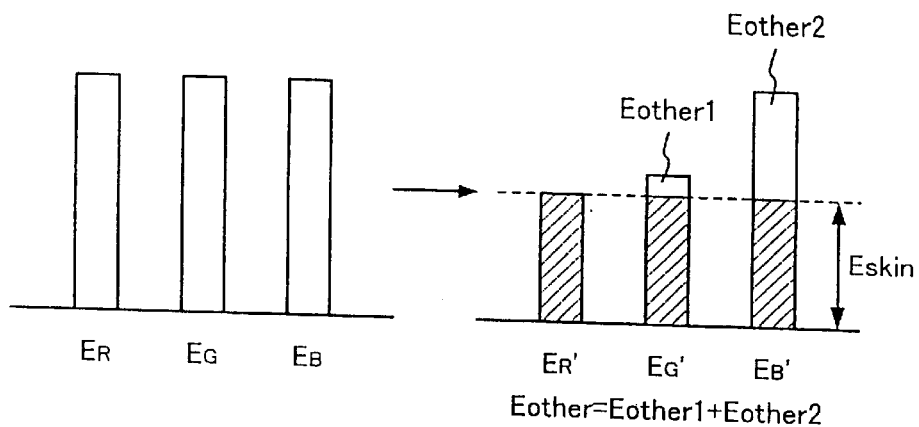
FIGS. 28A to 28C are schematic diagrams for explaining forming methods of the voltage $E_{skin}$ and the voltage $E_{other}$.
Figure 28B:
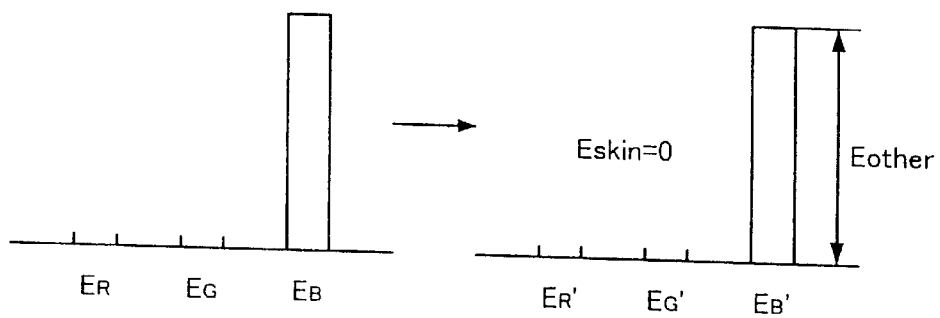
Figure 28C:
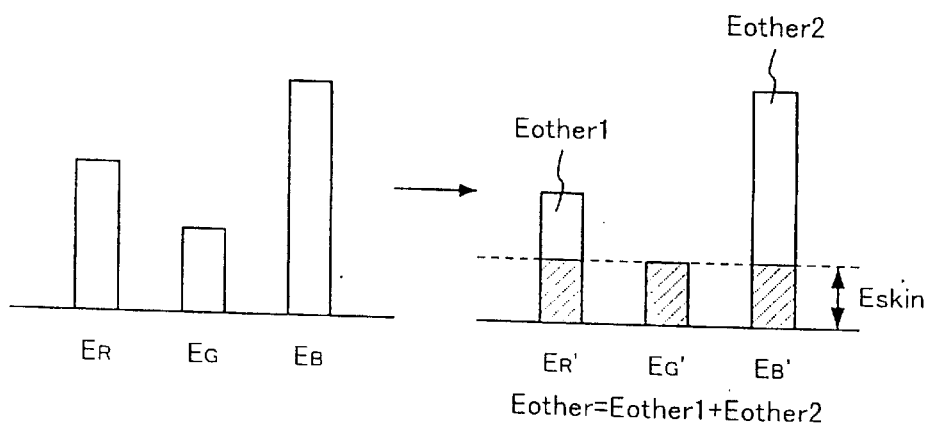

FIGS. 28A to 28C show examples of the skin color component $E_{skin}$ and the other color component $E_{other}$ in the actual color. FIG. 28A shows the example of white color and $E_R$, $E_G$, and $E_B$ are equal as shown on the left side in FIG. 28A. By normalizing white color by $K_R{'}$, $K_G{'}$, and $K_B{'}$, $E_R{'}$ becomes minimum as shown on the right side in FIG. 28A. In this instance, the skin color component $E_{skin}$ and the other color component $E_{other}$ are obtained as follows.

First, the component which is set to the minimum value after the normalization is set to the skin color component $E_{skin}$. In the example of FIG. 28A, $E_R{'}$ is set to the skin color component $E_{skin}$. The skin color component $E_{skin}$ is subtracted from each of the other components $E_G{'}$ and $E_B{'}$ after the normalization. The other components $E_G{'}$ and $E_B{'}$ are converted into $E_{other1}$ and $E_{other2}$. That is, $$E_{other1}=E_G{'}-\min(E_R{'}, E_G{'}, E_B{'})$$

and $$E_{other2}=E_B{'}-\min(E_R{'}, E_G{'}, E_B{'})$$

On the basis of them, the other color component $E_{other}$ is formed as $$E_{other}=E_{other1}+E_{other2}$$

In the examples shown in FIGS. 28B and 28C as well, the skin color component $E_{skin}$ and the other color component $E_{other}$ are obtained on the basis of a similar idea. In an example of the single blue color shown in FIG. 28B, the skin color component $E_{skin}$ is set to 0 and the other color component $E_{other}$ is set to the value of the monochromatic color component. In an example of an arbitrary color as shown in FIG. 28C, as mentioned above, the minimum value (in this example, $E_G{'}$) after the normalization is set to the skin color component $E_{skin}$ and, after completion of the normalization, differences between the components (in the example, $E_R{'}$ and $E_B{'}$) showing the values exceeding $E_{skin}$ and $E_{skin}$ are set to $E_{other1}$ and $E_{other2}$, respectively.

Two outputs derived by the skin color detecting circuit 122 and color component detecting circuit 123 as mentioned above, namely, the skin color component $E_{skin}$ and the other color component $E_{other}$ are supplied to one and another input terminals of the subtractor 124 and a subtraction between them is performed. That is, in the subtractor 124, a subtraction output of $E_{other}-E_{skin}$ is formed. By using this subtraction output, a gain of the GCA 125 is controlled.

That is, since the voltage $E_{other}$ is equal to 0 in the area detected to be the skin color, the subtraction output of the subtractor 124 is set to $-E_{skin}$. In case of the voltage, namely, $-E_{skin}$ of the area detected to be the skin color, the gain of the GCA 125 is set to 1. Thus, the color gain of the skin color area is set to 1. In an area except for the skin color area, since the voltage $E_{other}$ is generated, the subtraction output of ($E_{other}-E_{skin}$) of the subtractor 124 rises. Therefore, the color gain in the GCA 125 rises in accordance with the value of the voltage $E_{other}$. As the skin color component is smaller, the subtraction output in such an area rises more and the color gain further rises. As mentioned above, the color gains of the areas other than the area detected to be the skin color are raised.

In the above example, although the control of the color gain in the GCA 125 has been performed on the basis of the subtraction output which is obtained by subtracting the skin color component $E_{skin}$ from the other color component $E_{other}$ by the subtractor 124, the invention is not limited to this example. For example, it is also possible to construct such that a divider is provided in place of the subtractor 124 and the color gain of the GCA 125 is controlled by a division output obtained by dividing the other color component $E_{other}$ by the skin color component $E_{skin}$. In this case, to make the division output effectively operate even if the skin color component $E_{skin}$ is equal to 0 or a value near 0, it is desirable to limit the division output and to set a predetermined value to a maximum value.

Predetermined coefficients $\alpha$ and $\beta$ can be also multiplied to $E_{other1}$ and $E_{other2}$. That is, $$E_{other}=\alpha \times E_{other1}+\beta \times E_{other2}$$

The coefficients $\alpha$ and $\beta$ are set to proper values so as to increase a gain of a desired color in the GCA 125. For example, coefficients p, q, and r are set for the three primary color signals R, G, and B so as to select a desired color and coefficients of the color components corresponding to $E_{other1}$ and $E_{other2}$ are set to $\alpha$ and $\beta$, respectively. With this method, the color gain of the desired color can be raised to a value larger than an ordinary gain while keeping the gain of the skin color constant.

As colors which mentally have special meanings, for example, there are an advance color and a backward color besides the skin color. When those colors are arranged in the other color, the advance color is emphasized forward and the backward color is seen so as to sink. Therefore, an image can have a stereoscopic feeling by emphasizing the advance color and backward color. Red is a representative advance color. Blue is a representative backward color.

Figure 29A:
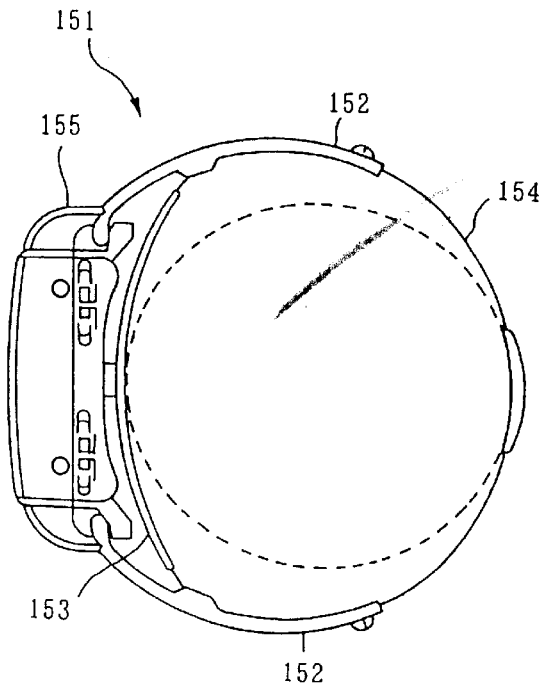
FIGS. 29A and 29B are diagrams showing the first example of a glasses type display apparatus to which the invention is applied.
Figure 29B:
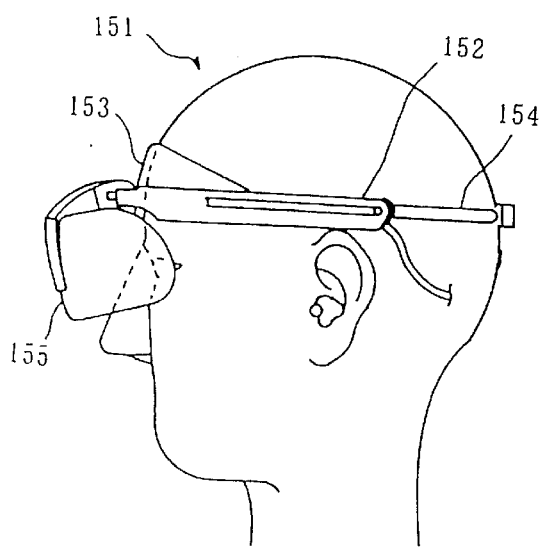

The invention can be also applied to a liquid crystal display apparatus of the glasses type other than a projector and a field double speed CRT. FIGS. 29A and 29B show the first example of the display apparatus. FIGS. 29A and 29B are diagrams when a state where a liquid crystal display apparatus (shown at reference numeral 151) of the glasses type is attached to the head portion of the human being are seen from the upper position and the lateral direction, respectively. The display apparatus 151 is attached to the head portion by strings 152 and expandable bands 153 and 154. An optical system including the liquid crystal display is constructed in a casing 155 attached to a front portion.

Figure 30:
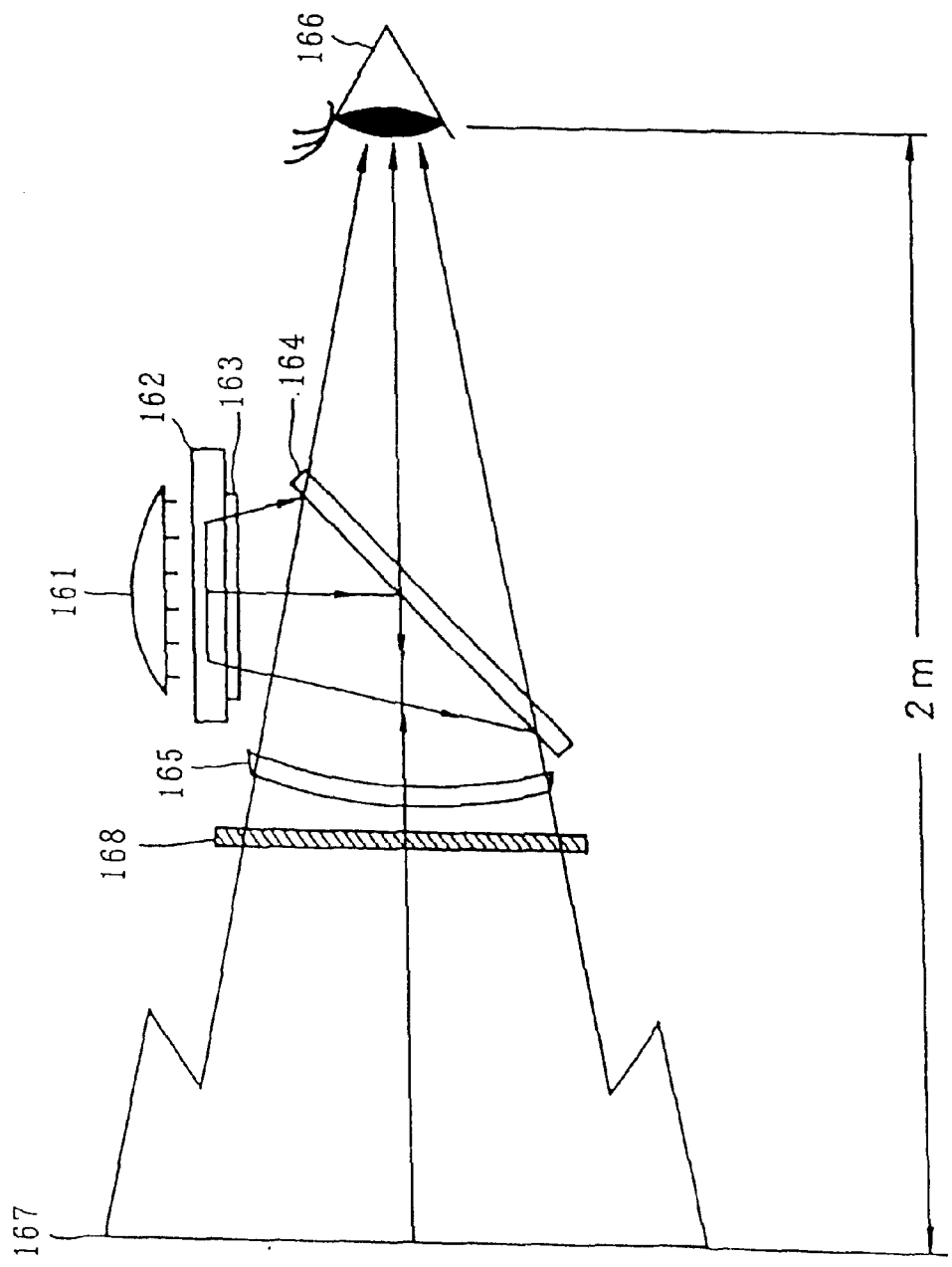
FIG. 30 is a schematic diagram for use in optical explanation of the glasses type display apparatus.

FIG. 30 schematically shows the optical system constructed in the casing 155. A color liquid crystal display panel 162 is driven on the basis of the supplied video signal. Two liquid crystal display panels constructed so that the right and left eyes separately see are used. FIG. 30 shows a construction of one side thereof. Reference numeral 161 denotes a back light such as a white fluorescent lamp or the like and 163 indicates a diffuser (diffusing plate).

Display light of the liquid crystal display panel 162 is reflected by a half mirror 164 and enters a concave half mirror 165. The video light reflected by the concave half mirror 165 enters an eye 166 via the half mirror 164. Therefore, the video image on the LCD panel 162 can be seen through the half mirror 164. Since the concave half mirror 165 is provided, the viewer can see the video image as if it was displayed larger at a position away from the actual position of the concave half mirror 165. For example, the viewer can feel a video image 167 as if the video image having a size of a screen of a type of 52 inches was virtually displayed at a position that is away from the position of the eye 166 at a distance of about 2 m.

Figure 31:
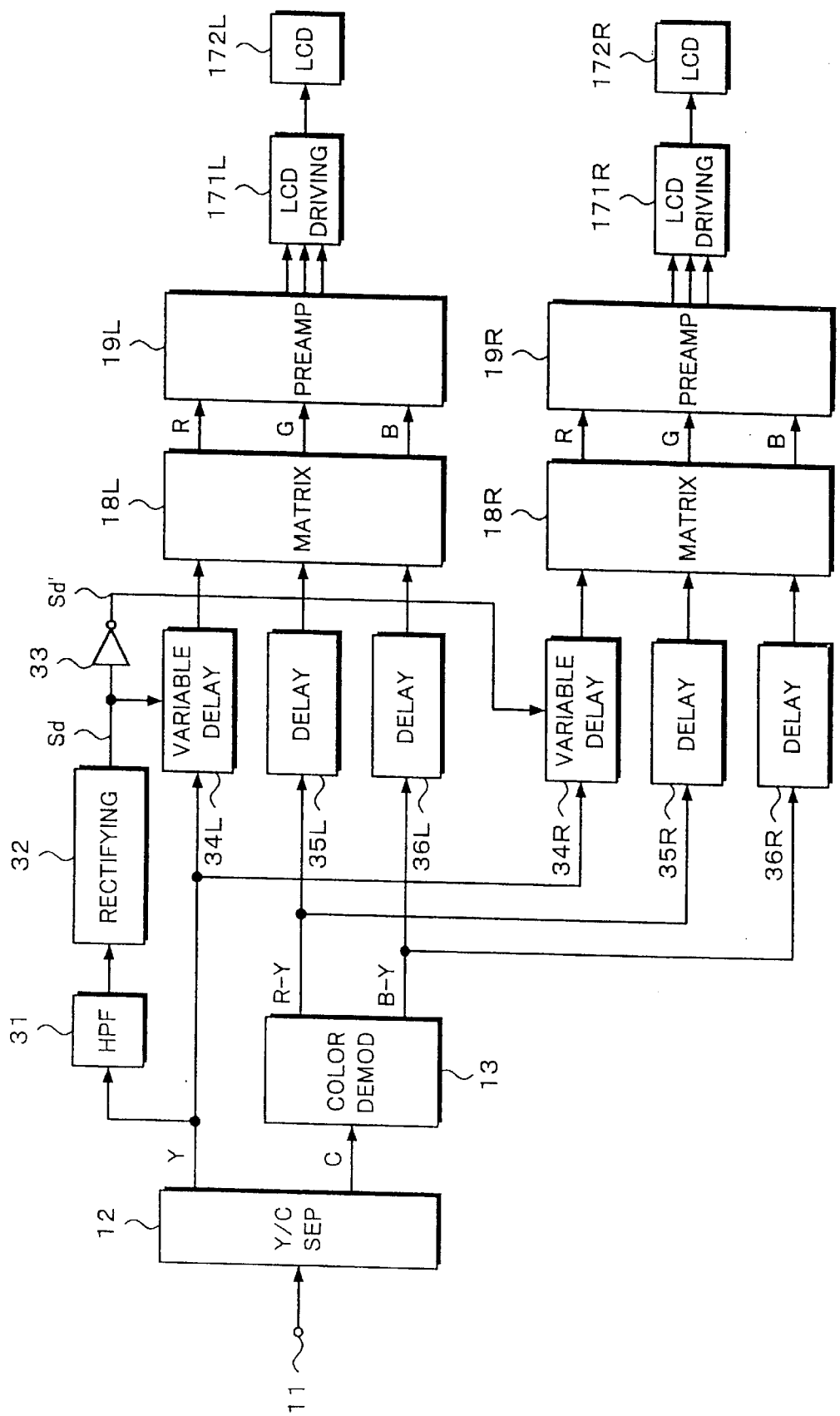
FIG. 31 is a block diagram of a modification to which the invention is applied.

The two liquid crystal display panels 162 are arranged so that they can be separately seen by the right and left eyes. By displaying the processed left-eye video and right-eye video images to the LCD panels, respectively, in a manner similar to the foregoing first embodiment, a stereoscopic feeling can be enhanced. FIG. 31 shows a signal processing system in case of using such a glasses type liquid crystal display. Three primary color signals processed in a manner similar to the construction of FIG. 3 are supplied to liquid crystal driving circuits 171L and 171R. Liquid crystal display panels 172L and 172R are driven by outputs of the liquid crystal driving circuits 171L and 171R, respectively. Further, even when one LCD panel is used, a stereoscopic feeling can be emphasized by using the field double speed process and shutter like a second embodiment.

As another example which is slightly different from the form of the display apparatus 151 shown in FIG. 29, it is also possible to presume an apparatus using two small displays (they are not limited to the liquid crystal displays) depending or locating in front of the head portion without using the bands 153 and 154. However, with respect to a point such that two small displays are used, the signal process is the same as that shown in FIG. 31. That is, the liquid crystal display panels 172L and 172R are driven by the liquid crystal driving circuits 171L and 171R, respectively.

Figure 32:
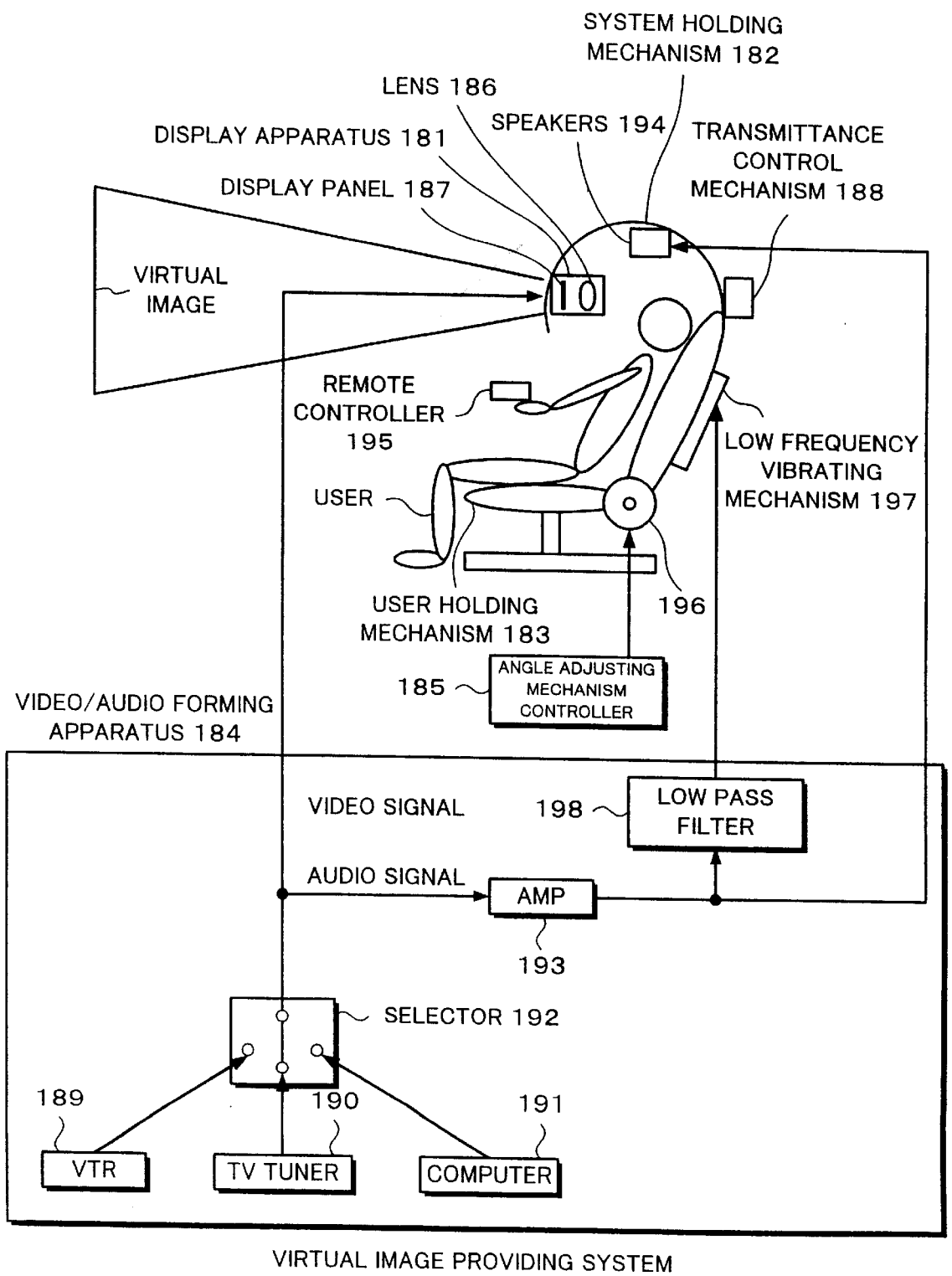
FIG. 32 is a diagram showing the second example of a display apparatus to which the invention is applied.

The second example of the display apparatus is shown in FIG. 32. According to the display apparatus shown in FIG. 32, the user can observe a virtual image with a presence in a relaxed state. A user holding mechanism 183 holds the user in a sitting state. For example, the user is held in a relaxed state by sitting onto a chair, sofa, or the like.

A reclining angle adjusting mechanism 196 is provided in a connecting portion of a reclining portion and a sitting portion of the user holding mechanism 183 and is controlled by an angle adjusting mechanism controller 185. The angle adjusting mechanism controller 185 is made operative in accordance with the operation of a remote controller 195. Therefore, when the user operates the remote controller 195, the angle adjusting mechanism controller 185 controls the reclining angle adjusting mechanism 196 in accordance with the operation of the remote controller 195. Thus, the reclining angle adjusting mechanism 196 changes an angle of the reclining portion of the user holding mechanism 183.

A low frequency vibrating mechanism 197 is provided, for example, in the reclining portion of the user holding mechanism 183. The low frequency vibrating mechanism 197 vibrates in response to an audio signal which is supplied via a low pass filter 198, which will be explained hereinlater. The user, consequently, can feel the audio signal via a vibration.

Further, in the upper portion of the reclining seat of the user holding mechanism 183, for example, a semispherical system holding mechanism 182 (fixing means) constructed so as to cover the head portion of the user when the user sits on the user holding mechanism is fixed. A display apparatus 181 and speakers 194 are provided in the system holding mechanism 182.

That is, in a state where the user is held in the user holding mechanism 183, the display apparatus 181 (video image providing apparatus) is fixed in the system holding mechanism 182 so as to be located almost in front of (on this side) the user. The user holding mechanism 183 holds the user so that an interval between the head portion of the user and the display apparatus 181 is equal to or less than, for example, 45 cm.

The display apparatus 181 has: a small display panel 187 (display means) constructed by, for example, a liquid crystal display or the like to display a video image which is supplied from a video/audio forming apparatus 184; and a lens 186 serving as an enlargement optical system for forming a fusion image by enlarging the video image displayed on the display panel 187 and arranging the virtual image which is observed by the right and left eyes of the user to a same position in a space. Thus, the virtual image obtained by enlarging the video image supplied from the video/audio forming apparatus 184 is provided to the user.

In a state where the user is held in the user holding mechanism 183, the speakers 194 are fixed in the system holding mechanism 182 in a manner such that they are located, for example, at a position almost over the user or on the right and left sides (for example, near the ears) of the user or the like and generate an acoustic signal (audio signal) which is supplied from the video/audio forming apparatus 184. Its volume can be controlled by the remote controller 195.

The system holding mechanism 182 is constructed by a device such as an ECD (Electrochromic Display) or the like in which a transmittance of light is variable (such a device is called a transmittance variable device hereinafter) or is constructed by assembling a liquid crystal shutter or the like into a transparent material. The system holding mechanism 182 has a transmittance control mechanism 188 to control the transmittance variable device, liquid crystal shutter, or the like. The transmittance control mechanism 188 controls the transmittance variable device, liquid crystal shutter, or the like in response to the operation of the remote controller 195, thereby changing an amount of light which enters the system holding mechanism 182 from the outside. Therefore, by operating the remote controller 195, the user changes the transmittance of the system holding mechanism 182, so that an external scenery (situation) can be seen or it is possible to prevent the external scene from entering the eyes, or the like.

The video/audio forming apparatus 184 outputs the video image to be displayed on the display apparatus 181 and the audio signal that is generated from the speakers 194. That is, in the second example, the video/audio forming apparatus 184 has a VTR (video tape recorder) 189, a TV tuner 190, and a computer 191. In the VTR 189, a video signal and an audio signal recorded on a video tape are reproduced. In the TV tuner 190, a video signal and an audio signal of a predetermined television broadcasting are received. In the computer 191, a video signal and an audio signal are reproduced from a recording medium such as a CD-ROM (Compact Disc—Read Only Memory) or the like or a video signal and an audio signal are received from a communication network such as an internet or the like.

The video signals and audio signals obtained by the VTR 189, TV tuner 190, and computer 191 are supplied to a selector 192. The selector 192 selects and generates the output of any one of the VTR 189, TV tuner 190, or computer 191 in accordance with the generation of the remote controller 195. The video signal selected by the selector 192 is supplied to the display apparatus 181 and the selected audio signal is amplified by an amplifier 193 and is transmitted to the speakers 194 and low pass filter 198. The low pass filter 198 extracts low frequency components of the audio signal and transmits to the low frequency vibrating mechanism 197.

The video signal selected by the selector 192 is supplied to the display apparatus 181 and is displayed by the display panel 187. The video signal displayed on the display panel 187 is enlarged by the lens 186 and the resultant virtual image formed is provided to the user held in the user holding mechanism 183. As mentioned above, the user can observe the virtual image at a remote position, so that the user can feel a space that is equivalent to an actual space or a space (virtual space) wider than the actual space.

In this instance, the user can change the transmittance of the system holding mechanism 182 covering the head portion of the user through the transmittance control mechanism 188 by operating the remote controller 195 as mentioned above. For example, when the transmittance is set to a low value, since most of the light entering from the outside is shut out, the user can be immersed into the virtual space. When the transmittance is set to a high value, contrarily, the user can observe the virtual image wile confirming the ambient situation. For instance, when the transmittance is gradually reduced, the user can enjoy a sense as if he was immersed into the virtual space from the actual world.

The audio signal selected by the selector 192 is amplified by the amplifier 193 and is supplied to the speakers 194 and is outputted. In the low pass filter 198, only low frequency components are further extracted from the audio signal amplified by the amplifier 193 and are transmitted to the low frequency vibrating mechanism 197. Thus, the low frequency vibrating mechanism 197 vibrates in correspondence to the low frequency components of the audio signal outputted from the speakers 194 and the user can feel the audio signal by the vibration. That is, in this case, a powerful audio/visual environment can be provided to the user. A vibrating level can be controlled by the remote controller 195.

Figure 33:
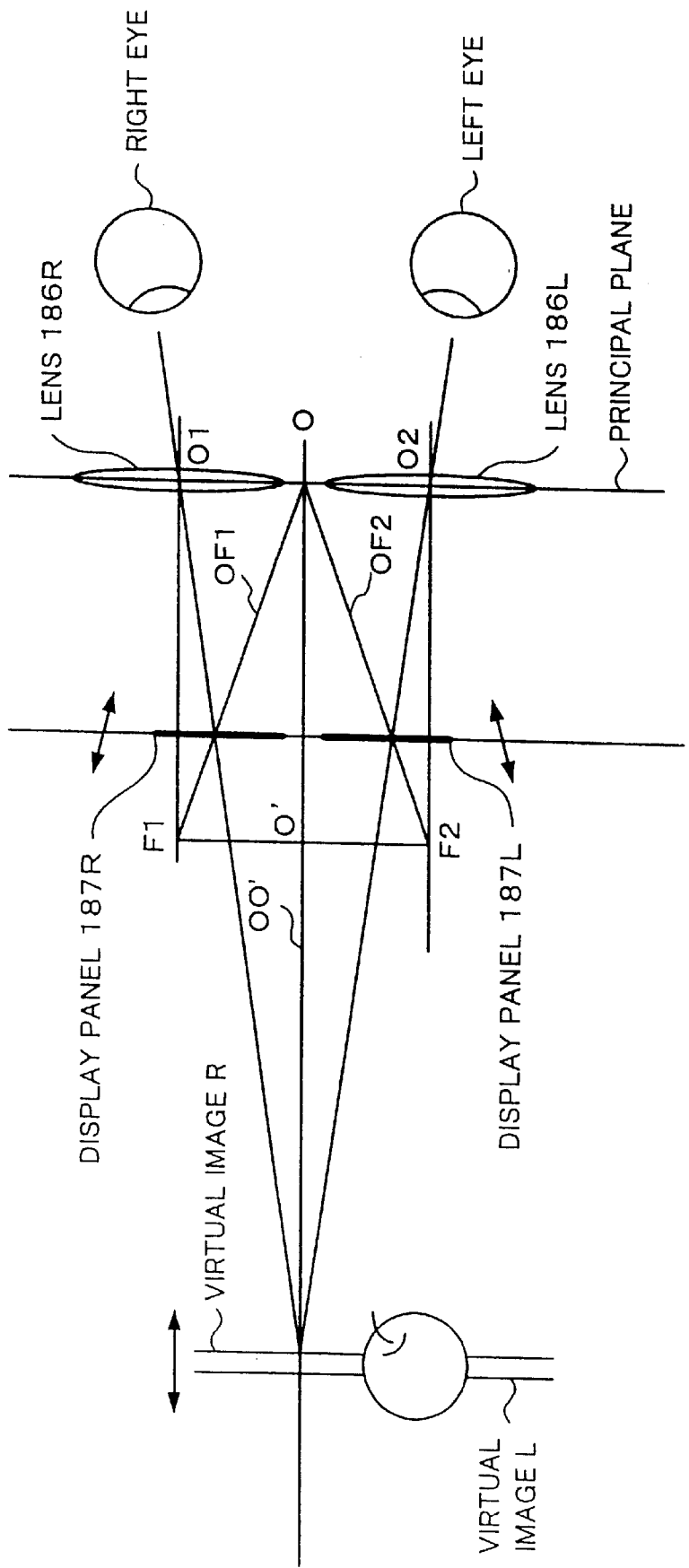
FIG. 33 is a diagram showing a constructional example of an optical system of a display apparatus.

An example of a construction of the optical system of the display apparatus 181 is shown in FIG. 33. FIG. 33 shows a constructional example in case of seeing the display apparatus 181 from the position over the head of the user held in the user holding mechanism 183. In the example of FIG. 33, the display apparatus 181 has a lens 186L serving as (constructing) an optical system for the left eye and a lens 186R serving as (constructing) an optical system for the right eye and these lenses have different optical axes as an enlargement optical system to form a virtual image by enlarging the video image.

That is, lenses 186R and 186L are convex lenses having the same characteristics to provide a virtual image R or L which is obtained by magnifying the video image displayed on a display panel 187R or 187L to the right eye or left eye and are arranged on the same plane. That is, the lenses 186R and 186L are arranged so that their principal planes coincide.

In FIG. 33, O1 or O2 denotes a principal point of the lens 186R or 186L; F1 or F2 indicates a focal point of the lens 186R or 186L; and O represents a middle point between the principal points O1 and O2.

The display panels 187R and 187L are arranged in a manner such that in the case where center points (for example, in the case where each of the display panels 187R and 187L has a rectangular shape, an intersecting point of diagonal lines of the rectangle, or the like) of the display panel 187R or 187L is located on a straight line OF1 or OF2 connecting the middle point O and the focal point F1 or F2 and both of the center points are located on the same plane.

According to the display apparatus 181 with the above construction, the video image displayed on the display panel 187R or 187L is magnified by the lens 186R or 186L and the light corresponding to the magnified video image enters the right or left eye, so that a virtual image corresponding to the video image is observed by the right or left eye. That is, the virtual image R or L formed by the lens 186R or 186L is observed by the right or left eye.

Further, although the virtual image which is observed by the right or left eye is formed by the lens 186R or 186L as a different optical system, those virtual images are arranged at the same position in a 3-dimensional space. That is, the virtual images which are observed by the right and left eyes of the user are arranged at the same position in the space.

Figure 34:
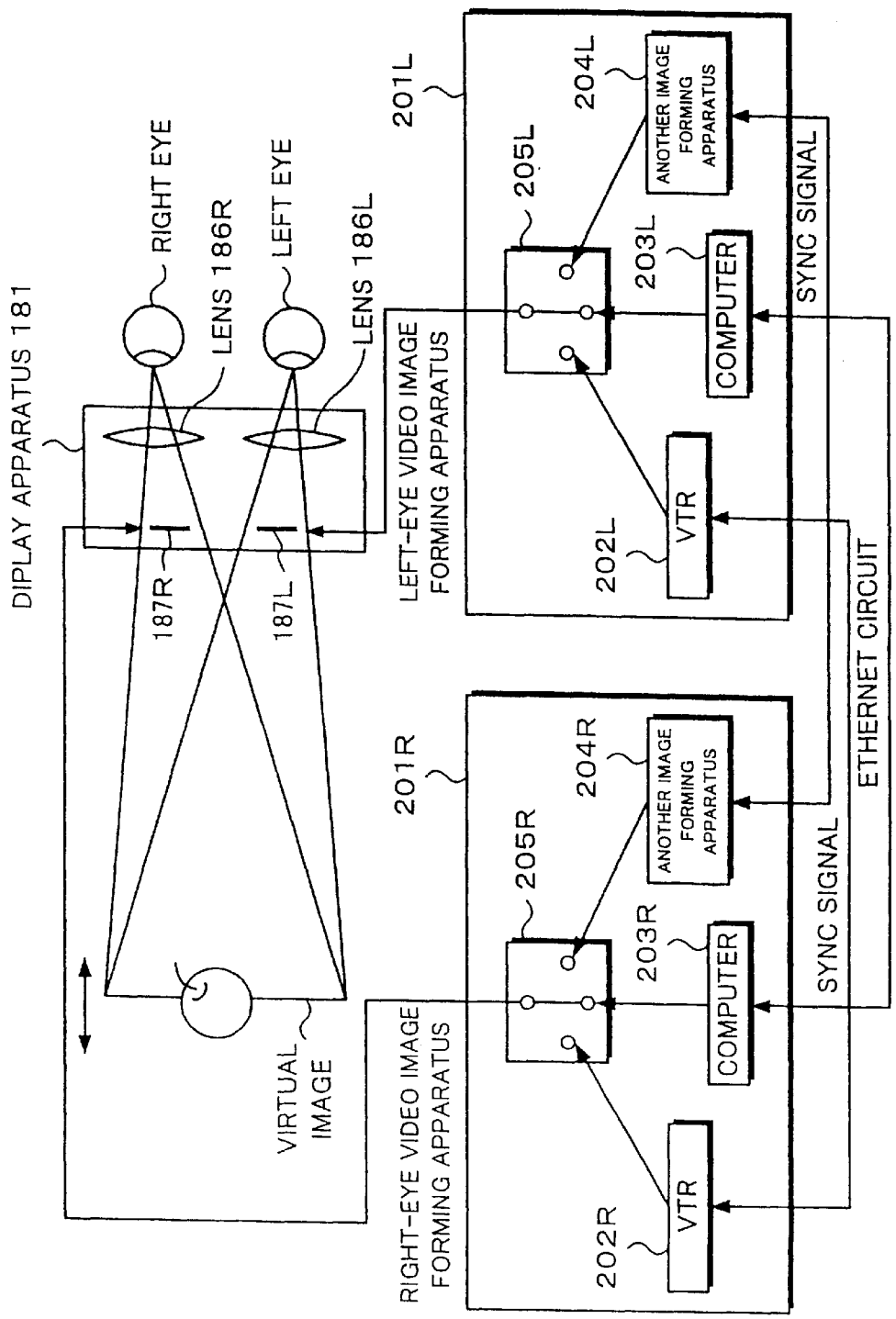
FIG. 34 is a diagram showing the third example of a display apparatus to which the invention is applied.

The third example of the display apparatus is shown in FIG. 34. In the foregoing second example, the virtual image with respect to the video image that is outputted from one video/audio forming apparatus 184 is observed by both of the right and left eyes of the user, thereby providing the 2-dimensional (plane) virtual image. In the third example, however, a virtual image about the video image that is outputted from a video image forming apparatus 201R for the right eye or a video image forming apparatus 201L for the left eye is observed by the right or left eye of the user, thereby providing a stereoscopic virtual image.

Specifically speaking, in a VTR 202R or 202L, a video tape on which a stereoscopic video image using a binocular parallax has been recorded is reproduced and a video image for the right eye or a video image for the left eye is outputted to a selector 205R or 205L. The VTRs 202R and 202L can mutually transmit and receive a sync signal, so that the video image for the right eye or the video image for the left eye is outputted from the VTR 202R or 202L in a synchronized state.

In a computer 203R or 203L, a video image for the right or left eye by computer graphics to provide a stereoscopic video image using a binocular parallax is formed and is outputted to the selector 205R or 205L respectively. The computers 203R and 203L are connected by a predetermined communication line such as a line of Ethernet or the like, so that the right-eye video image and the left-eye video image are outputted from those computers in a synchronous state.

In another image forming apparatus 204R or 204L as well, a right-eye or left-eye video image constructing a stereoscopic video image using a binocular parallax is formed and is outputted to the selector 205R or 205L in a synchronous state.

In the selector 205R, an output of any one of the VTR 202R, computer 203R, and another image forming apparatus 204R is selected and the selected output, namely, the right-eye video image is supplied to the display panel 187R. The selector 205L is synchronized with the selector 205R and selects the output corresponding to one of the VTR 202R, computer 203R, and another image forming apparatus 204R selected by the selector 205R and transmits the selected output, namely, the left-eye video image to the display panel 187L.

The image displayed on the display panel 187R or 187L is magnified by the lens 186R or 186L and enters the right or left eye of the user. Thus, the virtual image obtained by magnifying the video image for the right or left eye is observed by the right or left eye of the user, thereby providing a stereoscopic video image using the binocular parallax to the user.

In this case, the left or right eye of the user is directed to the virtual image for the right or left eye and, further, a focal adjustment is also performed so as to be matched to the virtual image for the right or left eye, respectively. Therefore, the user can observe a stereoscopic video image without substantially feeling any fatigue.

In the third example shown in FIG. 34, although the lenses 186R and 186L as convex lenses have been used as an enlargement optical system, even if concave mirrors are used, a stereoscopic video image can be provided in a manner similar to the case in FIG. 34.

Figure 35:
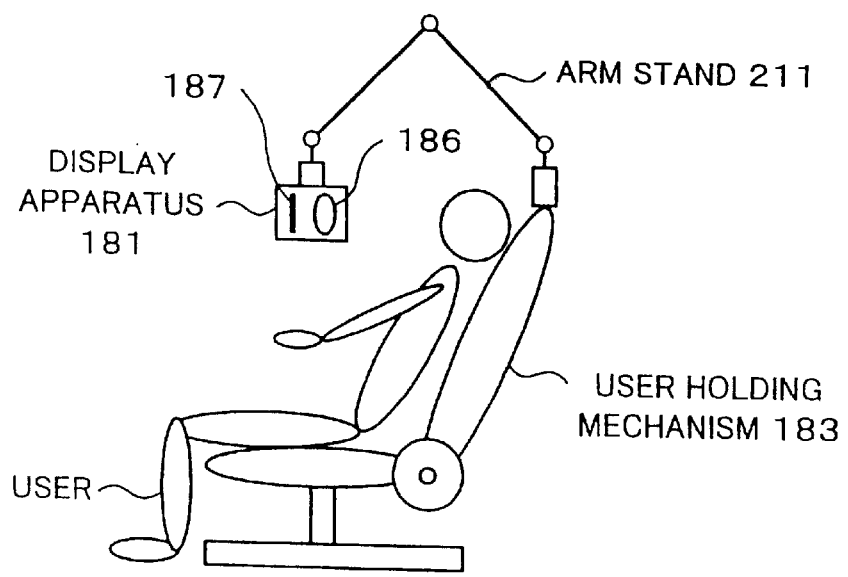
FIG. 35 is a diagram showing the fourth example of a display apparatus to which the invention is applied.

In the second example of FIG. 32, although the display apparatus 181 has been fixed in the semispherical system holding mechanism 182 fixed to the user holding mechanism 183, for example, as shown in FIG. 35, it is also possible to construct such that one end of an arm stand 211 is fixed to the user holding mechanism 183 and the display apparatus 181 is fixed to the other end of the arm stand 211.

As shown in FIG. 36, cylindrical hinge portions of the arm stand 211 are attached to a few portions and each hinge portion is rotatable around its center axis (straight line passing through the centers of two bottom surfaces of the cylinder).

In this case, therefore, the user can move the display apparatus 181 to a desired position and can observe a virtual image.

Figure 37A:
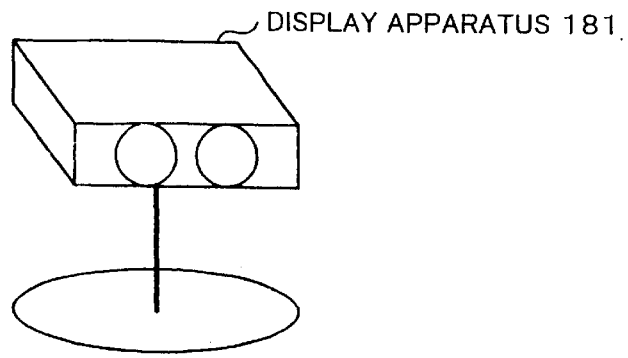
FIGS. 37A and 37B are diagrams showing the sixth example of a display apparatus to which the invention is applied.
Figure 37B:
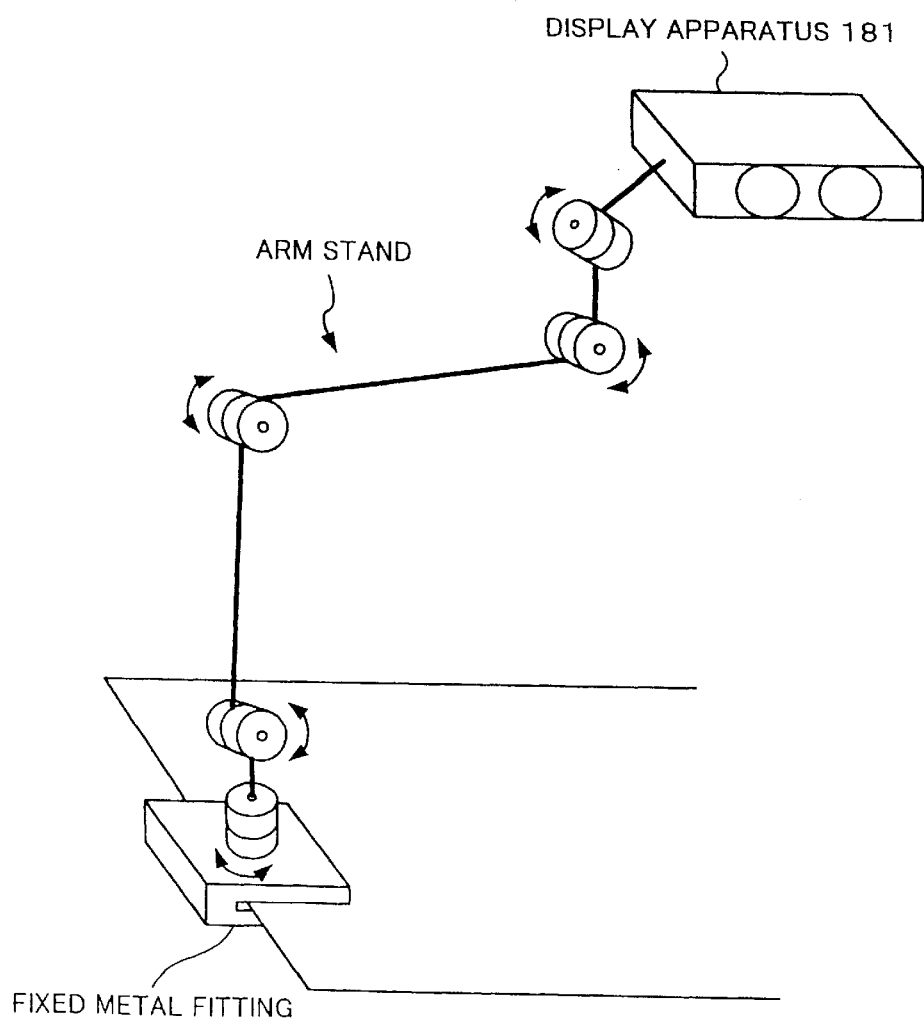

In the foregoing examples, the display apparatus 181 has been fixed to the user holding mechanism 183. However, the display apparatus 181 can be also constructed so as to be detachable from the user holding mechanism 183. In this case, for example, the removed display apparatus 181 can be fixed to a rod-like stand as shown in FIG. 37A or one end of an arm stand is fixed to a desk or the like by using a fixed metal fitting or the like and the display apparatus 181 is fixed to the other end of the arm stand and is used as shown in FIG. 37B.

The user holding mechanism 183 can be vibrated or inclined, for example, in the vertical direction, right/left direction, or front/rear direction in an interlocking relational manner with a virtual image to be observed by the user. For instance, when the user holding mechanism 183 is moved in an interlocking relational manner with a video image of a sky, a feeling as if the user was actually on an airplane can be given to the user.

The embodiment can be also applied to an HUD (Head Up Display). The video image displayed on the display panel in the HUD is magnified through a lens and the magnified image is reflected by a half mirror and when the user watches the reflected light, thereby forming a virtual image. The half mirror can transmits the light entering from the outside, so that the user can also see an ambient scene (situation) as light from the outside which passes through the half mirror together with a virtual image.

According to a modification of the invention, the front/rear feeling is detected by using the luminance signal or three primary color signals and depth information is controlled (modulated) in place of the position in the horizontal direction by a detection result. For example, a plurality of liquid crystal display panels are laminated, the foreground is displayed on the liquid crystal display panel on the front side, and the background is displayed on the liquid crystal display panel on the rear side. A display which can display depth information other than a multilayer liquid crystal display panel can be also used.

Further, even when one liquid crystal display panel is used, a stereoscopic feeling can be enhanced by using the field double speed process and shutter as in the second and third embodiments.

According to the invention, by using all of the factors by which a stereoscopic feeling is obtained or by combining parts of them, even in a 2-dimensional video signals, a stereoscopic feeling can be expressed. Not only a stereoscopic feeling for a moving object using the conventional Pulfrich's effect of the pendulum is emphasized but also a stereoscopic feeling can be expressed even in a still image.

According to the invention, a video image with a stereoscopic feeling due to the real-time process can be expressed by a relatively simple circuit for an input of most of the 2-dimensional video signals. Since a key of a single eye and a key of both eyes (with a little binocular parallax) are used, a natural stereoscopic feeling without any fatigue can be expressed.

The present invention is not limited to the foregoing embodiments but many modifications and variations are possible within the spirit and scope of the appended claims of the invention.

What is claimed is:

1. A video display apparatus for inputting a video signal and displaying a video image to a display apparatus, comprising:

front/rear feeling emphasizing means for shifting a position of an image in a horizontal scanning line in a horizontal direction in accordance with an amplitude level and a frequency level of a change in said video signal by using edge information or focusing information of the video signal and adding a binocular parallax (right/left eye non-corresponding area);

depth feeling emphasizing means for setting a center fusion image plane to a position behind a display surface by a parallel vergence;

glossy feeling emphasizing means for detecting a glossy portion of said image and emphasizing a contrast of one eye and/or both eyes in said glossy portion;

coring sharpness means for adding a sharpness to only an edge having a relatively large amplitude and high frequency components;

vertical aperture control means for raising frequency characteristics of a middle low band or higher at a change point in a vertical direction of said image; and color emphasizing means for detecting a skin color as a storage color and emphasizing color contrasts of colors other than said skin color, wherein a stereoscopic feeling is emphasized by using two or more of said means.

2. An apparatus according to claim 1, wherein said edge information or focusing information of said video signal corresponds to a maximum value of levels of R, G, and B of the video signal or a maximum value of change amounts of R, G, and B.

3. An apparatus according to claim 1, wherein said depth feeling emphasizing means arranges said center fusion image plane to an arbitrary position without fixing to a position behind the display surface.

4. An apparatus according to claim 1, wherein said front/rear feeling emphasizing means changes an addition amount of the binocular parallax (right/left eye non-corresponding area) based on said edge information or said focusing information and changes the addition amount of said binocular parallax (right/left eye non-corresponding area).

5. An apparatus according to claim 1, wherein said depth feeling emphasizing means arranges said center fusion image plane to an arbitrary position without fixing to a position behind the display surface, and said front/rear feeling emphasizing means changes an addition amount of the binocular parallax (right/left eye non-corresponding area) based on said edge information or said focusing information and changes the addition amount of said binocular parallax (right/left eye non-corresponding area).

6. An apparatus according to claim 1, wherein a front/rear area is presumed from said edge information or said focusing information and the binocular parallax (right/left eye non-corresponding area) is added every presumed area.

7. An apparatus according to claim 1, wherein said vertical aperture control is constructed by a shade emphasis in the vertical direction to changes a magnitude of an effect and characteristics of said vertical aperture control from a leading portion, a trailing portion, a white side, and a black side of said video signal.

8. An apparatus according to claim 1, wherein said front/rear feeling emphasizing means changes depth information as stereoscopic information in place of adding said binocular parallax (right/left eye non-corresponding area) to said video signal.

9. A video display method of inputting a video signal and displaying a video image to a display apparatus, comprising:

a front/rear feeling emphasizing step of shifting a position of an image in a horizontal scanning line in a horizontal direction in accordance with an amplitude level and a frequency level of a change in said video signal by using edge information or focusing information of the video signal and adding a binocular parallax (right/left eye non-corresponding area);

a depth feeling emphasizing step of setting a center fusion image plane to a position behind a display surface by a parallel vergence;

a glossy feeling emphasizing step of detecting a glossy portion of said image and emphasizing a contrast of one eye and/or both eyes in said glossy portion;

a coring sharpness step of adding a sharpness to only an edge having a relatively large amplitude and high frequency components;

a vertical aperture control step of raising frequency characteristics of a middle low band or higher at a change point in a vertical direction of said image; and a color emphasizing step of detecting a skin color as a storage color and emphasizing color contrasts of colors other than said skin color, wherein a stereoscopic feeling is emphasized by using two or more of said steps.

* * * * *